US012639680B1

(12) United States Patent
Eidson et al.

(10) Patent No.: US 12,639,680 B1
(45) Date of Patent: May 26, 2026

(54) FINANCIAL SECURITY INDICATOR

(71) Applicant: United Services Automobile Association (USAA), San Antonio, TX (US)

(72) Inventors: Alexis M. Eidson, San Antonio, TX (US); Christina N. Nickel, Boeme, TX (US); Matthew Quagliara, San Antonio, TX (US); Raymond John Zurcher, San Antonio, TX (US); Ronald Romanowski, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 389 days.

(21) Appl. No.: 17/988,965

(22) Filed: Nov. 17, 2022

Related U.S. Application Data

(63) Continuation of application No. 17/181,198, filed on Feb. 22, 2021, now Pat. No. 11,526,857, which is a continuation of application No. 15/211,874, filed on Jul. 15, 2016, now Pat. No. 10,956,879, which is a continuation-in-part of application No. 14/284,132, filed on May 21, 2014, now abandoned, which is a continuation-in-part of application No. 13/833,182, filed on Mar. 15, 2013, now abandoned.

(51) Int. Cl.
| | |
|---|---|
| *G06Q 20/10* | (2012.01) |
| *G06Q 20/42* | (2012.01) |
| *G06Q 40/06* | (2012.01) |
| *G06Q 40/08* | (2012.01) |

| | |
|---|---|
| *H04L 67/50* | (2022.01) |
| *H04L 67/52* | (2022.01) |

(52) U.S. Cl.
CPC ............. *G06Q 20/10* (2013.01); *G06Q 20/42* (2013.01); *G06Q 40/06* (2013.01); *G06Q 40/08* (2013.01); *H04L 67/52* (2022.05); *H04L 67/535* (2022.05)

(58) Field of Classification Search
USPC .......................................................... 705/35
See application file for complete search history.

(56) References Cited

U.S. PATENT DOCUMENTS

| | | | | | |
|---|---|---|---|---|---|
| 5,513,117 | A | * | 4/1996 | Small ................... | G07F 17/0042 700/235 |
| 5,732,136 | A | * | 3/1998 | Murphree ............ | G06Q 20/204 379/91.01 |

(Continued)

OTHER PUBLICATIONS

Lyn C. Thomas*, A survey of credit and behavioural scoring: forecasting financial risk of lending to consumers, International Journal of Forecasting. (Forecast) (Year: 2000).*

(Continued)

*Primary Examiner* — Chikaodinaka Ojiaku
(74) *Attorney, Agent, or Firm* — Plumsea Law Group, LLC

(57) ABSTRACT

A method, apparatus and system are disclosed for providing a user with an indication of the user's financial security level. In order to achieve this, the user may be surveyed to provide information related to the user's attributes and current level of financial security. Based on the user's inputs, a financial security tool may generate a financial security score and monetary risk amount that provides an accurate interpretation of the user's financial security level.

14 Claims, 25 Drawing Sheets

100

| CORE BELIEFS |
|---|
| 1. Protect your life, loved ones and possessions |
| 2. Spend less than you earn |
| 3. Save enough for emergencies |
| 4. Save now for your retirement |
| 5. Prepare your will |
| 6. Build your net worth by outlining a financial plan and update it as your situation requires |

(56) References Cited

U.S. PATENT DOCUMENTS

| | | | | |
|---|---|---|---|---|
| 5,732,400 A * | 3/1998 | Mandler | G07F 7/08 | |
| | | | 705/26.82 | |
| 5,870,724 A * | 2/1999 | Lawlor | G06Q 20/108 | |
| | | | 705/14.69 | |
| 5,890,141 A | 3/1999 | Carney et al. | | |
| 6,332,127 B1 * | 12/2001 | Bandera | G06Q 30/0257 | |
| | | | 705/14.55 | |
| 6,522,889 B1 * | 2/2003 | Aarnio | H04N 1/00244 | |
| | | | 455/457 | |
| 6,539,363 B1 * | 3/2003 | Allgeier | G06Q 20/204 | |
| | | | 705/17 | |
| 6,609,113 B1 * | 8/2003 | O'Leary | G07F 19/20 | |
| | | | 705/40 | |
| 6,722,570 B1 * | 4/2004 | Eisele | G06K 7/10336 | |
| | | | 235/487 | |
| 6,996,542 B1 * | 2/2006 | Landry | G06Q 20/04 | |
| | | | 705/40 | |
| 6,999,943 B1 * | 2/2006 | Johnson | G06Q 30/06 | |
| | | | 705/37 | |
| 7,047,416 B2 * | 5/2006 | Wheeler | H04L 9/321 | |
| | | | 380/282 | |
| 7,165,052 B2 * | 1/2007 | Diveley | G06Q 20/102 | |
| | | | 705/45 | |
| 7,231,657 B2 * | 6/2007 | Honarvar | G06Q 20/4014 | |
| | | | 726/20 | |
| 7,296,734 B2 * | 11/2007 | Pliha | G06Q 40/02 | |
| | | | 235/382 | |
| 7,395,241 B1 * | 7/2008 | Cook | G06Q 20/0855 | |
| | | | 705/40 | |
| 7,766,223 B1 * | 8/2010 | Mello | G06Q 20/3223 | |
| | | | 235/379 | |
| 7,865,425 B2 * | 1/2011 | Waelbroeck | G06Q 40/00 | |
| | | | 705/37 | |
| 7,873,556 B1 * | 1/2011 | Dolan | G06Q 40/06 | |
| | | | 705/37 | |
| 7,974,869 B1 * | 7/2011 | Sharma | G06Q 30/02 | |
| | | | 705/7.31 | |
| 8,118,654 B1 * | 2/2012 | Nicolas | G06Q 40/00 | |
| | | | 705/37 | |
| 8,131,636 B1 | 3/2012 | Viera et al. | | |
| 8,229,458 B2 * | 7/2012 | Busch | H04W 4/80 | |
| | | | 455/456.1 | |
| 8,311,845 B2 * | 11/2012 | Vengroff | G06Q 30/0259 | |
| | | | 705/14.47 | |
| RE44,274 E | 6/2013 | Popadic et al. | | |
| 8,605,678 B2 * | 12/2013 | Karaoguz | H04W 36/0016 | |
| | | | 370/332 | |
| 8,606,497 B2 * | 12/2013 | Doherty | H04L 67/535 | |
| | | | 701/400 | |
| 9,165,304 B2 * | 10/2015 | Weiss | G06Q 30/02 | |
| 9,195,986 B2 | 11/2015 | Christy et al. | | |
| 10,210,767 B2 * | 2/2019 | Johansen | G06Q 10/00 | |
| 10,217,375 B2 * | 2/2019 | Waldron | H04L 63/08 | |
| 10,460,295 B1 | 10/2019 | Oakes, III et al. | | |
| 10,476,974 B2 * | 11/2019 | Jones-McFadden | | |
| | | | H04L 67/535 | |
| 10,482,432 B1 | 11/2019 | Oakes, III et al. | | |
| 10,510,088 B2 * | 12/2019 | Jones-McFadden | G06N 20/00 | |
| 10,614,517 B2 * | 4/2020 | Jones-McFadden | G06Q 40/02 | |
| 10,621,558 B2 * | 4/2020 | Jones-McFadden | G06Q 20/00 | |
| 10,735,356 B1 * | 8/2020 | Mantel | G06F 21/45 | |
| 10,873,542 B2 * | 12/2020 | Horvath | H04L 47/765 | |
| 11,121,989 B1 * | 9/2021 | Castinado | H04L 51/56 | |
| 11,182,753 B1 | 11/2021 | Oakes, III et al. | | |
| 11,288,898 B1 | 3/2022 | Moon | | |
| 11,328,267 B1 | 5/2022 | Medina, III | | |
| 11,410,108 B2 * | 8/2022 | Johnson | G06Q 40/06 | |
| 11,494,723 B2 * | 11/2022 | Johnson | G06Q 10/06393 | |
| 11,556,359 B2 * | 1/2023 | Hart | G06F 3/0482 | |
| 11,587,457 B1 * | 2/2023 | Arazi | H04W 4/029 | |
| 11,610,228 B2 * | 3/2023 | Cohn | H04W 4/21 | |
| 11,710,564 B1 * | 7/2023 | Maier | G16H 10/20 | |
| | | | 706/11 | |
| 12,204,564 B2 * | 1/2025 | Malhotra | G06F 21/577 | |
| 2001/0020949 A1 | 9/2001 | Gong et al. | | |
| 2001/0044787 A1 * | 11/2001 | Shwartz | G06Q 20/12 | |
| | | | 705/78 | |
| 2002/0075380 A1 | 6/2002 | Seeger et al. | | |
| 2002/0152176 A1 * | 10/2002 | Neofytides | G06Q 40/03 | |
| | | | 705/64 | |
| 2003/0046223 A1 * | 3/2003 | Crawford | G06Q 20/10 | |
| | | | 705/38 | |
| 2003/0097331 A1 * | 5/2003 | Cohen | G06Q 20/108 | |
| | | | 705/42 | |
| 2003/0115151 A1 * | 6/2003 | Wheeler | G06Q 20/00 | |
| | | | 705/64 | |
| 2003/0119478 A1 | 6/2003 | Nagy et al. | | |
| 2003/0154406 A1 * | 8/2003 | Honarvar | G07C 9/37 | |
| | | | 713/153 | |
| 2003/0233317 A1 * | 12/2003 | Judd | G07F 19/211 | |
| | | | 705/39 | |
| 2004/0136586 A1 | 7/2004 | Okamura | | |
| 2004/0193878 A1 | 9/2004 | Dillinger et al. | | |
| 2005/0001924 A1 | 1/2005 | Honda | | |
| 2005/0102208 A1 * | 5/2005 | Gudgeon | G06Q 40/06 | |
| | | | 705/36 R | |
| 2005/0133586 A1 | 6/2005 | Rekeweg et al. | | |
| 2005/0273430 A1 * | 12/2005 | Pliha | G06Q 40/02 | |
| | | | 705/42 | |
| 2006/0124728 A1 | 6/2006 | Kotovich et al. | | |
| 2006/0270421 A1 * | 11/2006 | Phillips | G08B 21/0269 | |
| | | | 455/457 | |
| 2007/0192338 A1 * | 8/2007 | Maier | G06F 16/283 | |
| 2008/0013831 A1 | 1/2008 | Aoki | | |
| 2008/0189209 A1 * | 8/2008 | Loomis | G06Q 20/10 | |
| | | | 705/44 | |
| 2008/0242317 A1 * | 10/2008 | Abhyanker | H04W 4/029 | |
| | | | 455/456.3 | |
| 2008/0250196 A1 | 10/2008 | Mori | | |
| 2009/0171723 A1 * | 7/2009 | Jenkins | G06Q 10/10 | |
| | | | 705/38 | |
| 2009/0176511 A1 * | 7/2009 | Morrison | H04W 4/029 | |
| | | | 455/456.3 | |
| 2009/0222347 A1 * | 9/2009 | Whitten | G06Q 30/018 | |
| | | | 705/317 | |
| 2009/0240574 A1 * | 9/2009 | Carpenter | G06Q 40/06 | |
| | | | 705/36 R | |
| 2010/0038839 A1 | 2/2010 | DeWitt et al. | | |
| 2010/0069093 A1 * | 3/2010 | Morrison | G08G 1/096716 | |
| | | | 455/456.3 | |
| 2010/0069155 A1 * | 3/2010 | Schwartz | G07F 17/32 | |
| | | | 463/42 | |
| 2010/0076890 A1 * | 3/2010 | Low | G06Q 20/3267 | |
| | | | 705/44 | |
| 2010/0112975 A1 * | 5/2010 | Sennett | H04W 4/90 | |
| | | | 455/404.1 | |
| 2010/0161408 A1 * | 6/2010 | Karson | G06Q 30/0244 | |
| | | | 705/14.43 | |
| 2010/0201711 A1 | 8/2010 | Fillion et al. | | |
| 2010/0262607 A1 * | 10/2010 | Vassilvitskii | G06Q 30/02 | |
| | | | 707/742 | |
| 2010/0287250 A1 * | 11/2010 | Carlson | G06Q 30/0269 | |
| | | | 709/224 | |
| 2011/0015963 A1 * | 1/2011 | Chafle | G06Q 10/063116 | |
| | | | 455/466 | |
| 2011/0016109 A1 * | 1/2011 | Vassilvitskii | G06Q 30/02 | |
| | | | 707/E17.084 | |
| 2011/0054780 A1 * | 3/2011 | Dhanani | G01S 5/019 | |
| | | | 701/465 | |
| 2011/0082747 A1 * | 4/2011 | Khan | G06Q 30/0261 | |
| | | | 709/204 | |
| 2011/0083101 A1 * | 4/2011 | Sharon | H04W 4/029 | |
| | | | 709/204 | |
| 2011/0105092 A1 * | 5/2011 | Felt | H04W 4/021 | |
| | | | 455/414.1 | |
| 2011/0112985 A1 * | 5/2011 | Kocmond | G06Q 40/06 | |
| | | | 705/36 R | |
| 2011/0258049 A1 * | 10/2011 | Ramer | G06Q 30/0273 | |
| | | | 705/14.69 | |

(56)                References Cited

U.S. PATENT DOCUMENTS

| | | | |
|---|---|---|---|
| 2011/0282731 A1* | 11/2011 | Guglielmi | G06Q 30/0244 705/14.43 |
| 2012/0036014 A1* | 2/2012 | Sunkada | G06Q 30/0261 705/14.54 |
| 2012/0052874 A1* | 3/2012 | Kumar | G01S 5/02521 455/456.1 |
| 2012/0098705 A1* | 4/2012 | Yost | G01S 5/0027 342/450 |
| 2012/0109793 A1* | 5/2012 | Abeles | G06Q 40/123 705/31 |
| 2012/0109802 A1* | 5/2012 | Griffin | G06Q 40/00 705/35 |
| 2012/0113489 A1 | 5/2012 | Heit et al. | |
| 2012/0130853 A1* | 5/2012 | Petri | G06Q 30/0609 705/26.35 |
| 2012/0150767 A1* | 6/2012 | Chacko | G06Q 40/02 705/36 R |
| 2012/0230577 A1 | 9/2012 | Calman et al. | |
| 2012/0296768 A1* | 11/2012 | Fremont-Smith | G06Q 40/02 705/26.1 |
| 2013/0021651 A9 | 1/2013 | Popadic et al. | |
| 2013/0191261 A1* | 7/2013 | Chandler | G06Q 40/00 705/35 |
| 2013/0324160 A1* | 12/2013 | Sabatellil | H04W 4/022 455/456.3 |
| 2013/0332219 A1* | 12/2013 | Clark | G06Q 10/1093 705/7.19 |
| 2013/0346306 A1* | 12/2013 | Kopp | G06Q 20/34 705/41 |
| 2013/0346307 A1* | 12/2013 | Kopp | G06Q 20/349 705/41 |
| 2014/0010467 A1 | 1/2014 | Mochizuki et al. | |
| 2014/0032406 A1 | 1/2014 | Roach et al. | |
| 2014/0037183 A1 | 2/2014 | Gorski et al. | |
| 2014/0156501 A1* | 6/2014 | Howe | G06Q 40/03 705/38 |
| 2014/0203508 A1* | 7/2014 | Pedde | A63F 1/00 273/303 |
| 2014/0207673 A1* | 7/2014 | Jeffries | G06Q 20/405 705/43 |
| 2014/0207674 A1* | 7/2014 | Schroeder | G06Q 20/4016 705/43 |
| 2014/0244476 A1* | 8/2014 | Shvarts | G06Q 40/03 705/38 |
| 2014/0337140 A1* | 11/2014 | Caldwell | G06Q 30/0269 705/14.66 |
| 2014/0351137 A1* | 11/2014 | Chisholm | G06Q 20/04 705/44 |
| 2014/0358599 A1* | 12/2014 | McLaughlin | G06Q 10/02 705/5 |
| 2014/0365355 A1* | 12/2014 | Shvarts | G06Q 40/03055 705/38 |
| 2014/0374486 A1 | 12/2014 | Collins, Jr. | |
| 2015/0052003 A1* | 2/2015 | Tang | G06Q 30/0631 705/26.7 |
| 2015/0134517 A1* | 5/2015 | Cosgray | H04W 4/14 705/40 |
| 2015/0186920 A1* | 7/2015 | Sayler | G06Q 30/0239 705/14.39 |
| 2015/0199763 A1* | 7/2015 | Birkhead | G06Q 40/06 705/36 R |
| 2015/0244994 A1 | 8/2015 | Jang et al. | |
| 2015/0294523 A1 | 10/2015 | Smith | |
| 2015/0348591 A1 | 12/2015 | Kaps et al. | |
| 2015/0364057 A1* | 12/2015 | Catani | G16H 10/60 434/262 |
| 2015/0370597 A1* | 12/2015 | Faaborg | G06N 5/04 718/102 |
| 2016/0026866 A1 | 1/2016 | Sundaresan | |
| 2016/0239282 A1* | 8/2016 | Evans | G06F 8/61 |
| 2017/0039637 A1* | 2/2017 | Wandelmer | G06Q 40/03 |
| 2017/0068421 A1* | 3/2017 | Carlson | G06F 3/04817 |
| 2017/0132583 A1* | 5/2017 | Nair | G06Q 40/03 |
| 2017/0229149 A1 | 8/2017 | Rothschild et al. | |
| 2018/0189825 A1* | 7/2018 | Lin | G06F 17/18 |
| 2018/0197118 A1* | 7/2018 | McLaughlin | G07C 9/20 |
| 2019/0026577 A1 | 1/2019 | Hall et al. | |
| 2019/0122222 A1* | 4/2019 | Uechi | G06Q 20/42 |
| 2020/0075152 A1* | 3/2020 | Radovcic | G16H 20/60 |
| 2020/0103244 A1* | 4/2020 | Cella | G07C 5/0866 |
| 2020/0285464 A1* | 9/2020 | Brebner | G06N 20/00 |
| 2021/0056618 A1* | 2/2021 | Brown | G06Q 40/02 |
| 2021/0097615 A1* | 4/2021 | Gunn, Jr. | G06F 40/205 |
| 2021/0099358 A1* | 4/2021 | Nishizaki | H04L 67/561 |
| 2021/0158397 A1* | 5/2021 | Hanafee | G06Q 30/0201 |
| 2021/0334875 A1* | 10/2021 | Li | G06Q 30/0631 |
| 2022/0027951 A1* | 1/2022 | Flowers | G06Q 30/0255 |
| 2022/0300527 A1* | 9/2022 | Stein | G06Q 50/265 |

OTHER PUBLICATIONS

T. Bujlow, V. Carela-Español, J. Solé-Pareta and P. Barlet-Ros, "A Survey on Web Tracking: Mechanisms, Implications, and Defenses," in Proceedings of the IEEE, vol. 105, No. 8, pp. 1476-1510, Aug. 2017,(Survey). (Year: 2017).*

ANS X9.100-160-1-2004, Part 1: Placement and Location of Magnetic Ink Printing (MICR), American National Standard for Financial Services, approved Oct. 15, 2004.

Clancy, Heather, "Turning cellphones into scanners", The New York Times, Feb. 12, 2005; https://www.nytimes.com/2005/02/12/busienss/worldbusiness/turning-cellphones-into-scanners.html.

Consumer Guide to Check 21 and Substitute Checks, The Federal Reserve Board, The Wayback Machine—Oct. 28, 2004 https://web.archive.org/web/20041102233724/http://www.federalreserve.gov.

Curtin, Denis P., A Short Course in Digital Photography Chapter 7 Graphic File Formats.

Dance, Christopher, "Mobile Document Imaging", Xerox, Research Centre Europe, XRCE Image Processing Area, Nov. 2004.

Digital Photography Now, Nokia N73 Review, Oct. 28, 2006.

Federal Reserve System, 12 CFR Part 229, Regulation CC: Docket No. R-1176, Availability of Funds and Collection of Checks, Board of Governors of the Federal Reserve System Final rule.

Financial Services Policy Committee, Federal Reserve Banks Plan Black-and-White Image Standard and Quality Checks, May 18, 2004.

MICR-Line Issues Associated With the Check 21 Act and the Board's Proposed Rule, Prepared by Federal Reserve Board Staff, Apr. 27, 2004.

Microsoft Computer Dictionary Fifth Edition—Copyright 2002.

HTTP Over TLS, Network Working Group, May 2000, Memo.

Nokia N73—Full phone specifications.

Ranjan, Amit, "Using a Camera with Windows Mobile 5", Jul. 21, 2006.

Reed, John, "FT.com site: Mobile users branch out", ProQuest, Trade Journal, Oct. 6, 2005.

Weiqui Luo et al., "Robust Detection of Region-Duplication Forgery in Digital Image" Guoping Qui, School of Computer Science, University of Nottingham, NG8 1BB, UK—Jan. 2006.

Final Written Decision relating to U.S. Pat. No. 8,699,779, IPR2021-01070, Jan. 19, 2023.

Final Written Decision relating to U.S. Pat. No. 8,977,571, IPR2021-01073, Jan. 19, 2023.

Final Written Decision relating to U.S. Pat. No. 10,621,559, IPR2021-01077, Jan. 20, 2023.

* cited by examiner

100

| CORE BELIEFS |
|---|
| 1. Protect your life, loved ones and possessions |
| 2. Spend less than you earn |
| 3. Save enough for emergencies |
| 4. Save now for your retirement |
| 5. Prepare your will |
| 6. Build your net worth by outlining a financial plan and update it as your situation requires |

| Do you have adequate insurance coverage? |
|---|
| - Do you have Property Insurance?<br>   • Analyze the ownership, adequacy and risk of Property Insurance |
| - Do you have Automobile Insurance?<br>   • Analyze the ownership, adequacy and risk of Automobile Insurance |
| - Do you have Life Insurance?<br>   • Analyze the ownership, adequacy and risk of Life Insurance |
| - Do you have Long Term Care Insurance?<br>   • Analyze the ownership, adequacy and risk of Long Term Care Insurance |
| - Do you have Disability Insurance?<br>   • Analyze the ownership, adequacy and risk of Disability Insurance |
| - Do you have Health Insurance?<br>   • Analyze the ownership, adequacy and risk of Health Insurance |

| State | Homeowner's Average Premium | Renter's Average Premium | Average Home Price |
|---|---|---|---|
| Alabama | $987 | $216 | $153,099 |
| Alaska | $892 | $181 | $263,931 |
| Arizona | $642 | $201 | $182,553 |
| Arkansas | $919 | $226 | $139,124 |
| California | $922 | $218 | $391,609 |
| . . . | . . . | . . . | |

Figure 3B 300C-1

| Accident Type | Frequency | Severity | Risk |
|---|---|---|---|
| Bodily Injury | 0.92% | $14,848 | $137 |
| Property Damage | 3.56% | $2,958 | $105 |
| Collision | 5.74% | $2,861 | $164 |
| Comprehensive | 2.79% | $1,489 | $42 |
| | | | Total Risk: $448 |

300C-2

| Age Group | % In Accident | Calculated Index | Age Adjusted Risk |
|---|---|---|---|
| 20-24 years old | 0.185% | 1.69 | $757 |
| 25-34 years old | 0.122% | 1.11 | $497 |
| 35-44 years old | 0.095% | 0.86 | $385 |
| 45-54 years old | 0.076% | 0.69 | $309 |
| 55-64 years old | 0.063% | 0.57 | $255 |
| 65-74 years old | 0.052% | 0.47 | $211 |
| 75 years and older | 0.056% | 0.51 | $228 |

| Age | Mortality Rate (M) | Mortality Rate (F) | Marital Status and # of Dependents |
|---|---|---|---|
| 18 years old | 0.10% | 0.04% | x |
| 19 years old | 0.11% | 0.04% | x |
| 20 years old | 0.13% | 0.04% | x |
| 21 years old | 0.14% | 0.05% | x |
| 22 years old | 0.15% | 0.05% | x |
| 23 years old | 0.15% | 0.05% | x |
| 24 years old | 0.15% | 0.05% | x |

| Age | Annual Premium | Monthly Premium |
|---|---|---|
| Less than 45 years old | 0 | 0 |
| 45 years old | $465 | $38.75 |
| 55 years old | $739 | $61.58 |
| 65 years old | $1,261 | $105.08 |
| 75 years old | $2,271 | $189.25 |

| Age | Probability/year | Probability/5 years |
|---|---|---|
| 25 years old | 1.1% | 5.5% |
| 30 years old | 1.2% | 6.0% |
| 35 years old | 1.4% | 6.83% |
| 40 years old | 1.6% | 7.8% |
| 45 years old | 1.8% | 9.0% |
| 50 years old | 2.2% | 11.0% |
| 55 years old | 2.7% | 13.5% |

| Do you have an adequate monthly budget? |
|---|
| - What is your total debt?<br>    • Analyze the total debt to income ratio |
| - What is your total housing debt?<br>    • Analyze the debt to housing ratio |
| - Are you making your monthly payments?<br>    • Analyze whether customer is keeping current on monthly payments |

| Do you have an amount of emergency funds saved up? |
|---|
| -    How much in emergency funds do you have saved up?<br>        •    Analyze the amount of emergency funds saved up |

| Do you have an adequate retirement plan? |
|---|
| -   How much of your income do you save for retirement?<br>    •   Analyze the customer's retirement plan and/or goals |

| Do you have adequate legal documents prepared? |
|---|
| - Is your will prepared?<br>    • Analyze the customer's preparation of a will |

| Do you have adequate wealth accumulation? |
|---|
| -　　What is your level of wealth?<br>　　　*　　Analyze the customer's wealth |

| Pre-Populated Information | |
|---|---|
| Age | 35 |
| Gender | Male |
| Marital Status | Married |
| Number of Dependents | 2 |
| Credit Score | 680 |
| State of Residence | TX |

1002

| Survey Questions | |
|---|---|
| Individual Gross Annual Income | $100,000 |
| Individual Gross Income | $75,000 |
| Employed/Not Employed/Retired | Employed |
| Monthly Housing Payments | $2,250 |
| Monthly Debt Payments | $1,000 |
| Months of Expenses Saved (Emergency Fund) | 3-5 mo. |
| Employment Security | Somewhat Secure |
| Home Insurance Coverage? | Yes |
| Auntomobile Insurance Coverage? | Yes |
| Health Insurance Coverage? | Yes |
| Disability Insurance Coverage? | Yes |
| Life Insurance Coverage Amount | $200,000 |
| Long Term Care Insurance Coverage? | Yes |
| Legal Documents Prepared? | Some |
| Updated Will or Trust? | No |
| Financial Plan/Retirement Plan? | No |
| Monthly Retirement Savings | $1,000 |
| Total Retirement Savings | $50,000 |
| Retirement Age | 65 |
| Investment Return Level | High |
| Savings for College? | Some |
| Net Worth | $250,000 |
| Own home or rent? | Own |
| Value of home | $200,000 |

1003-A

| Category | Risk (S) | Total Possible Score | Calculated Financial Security Score |
|---|---|---|---|
| Health Insurance | 1,384 | 15 | 12 |
| Disability Insurance | 540 | 6 | 6 |
| Automobile Insurance | 677 | 8 | 8 |
| Property/ Umbrella | 411 | 5 | 5 |
| Life Insurance | 1,156 | 13 | 4 |
| Long Term Care Insurance | - | 0 | 0 |
| Wills & Guardianship | 340 | 4 | 0 |
| Emergency Fund | 1,221 | 14 | 7 |
| Debt Risk/Reward | 228 | 3 | 0 |
| Human Capital/Wealth | 900 | 10 | 2 |
| Retirement Savings | % on track | 10 | 10 |
| College Savings | % on track | 6 | 3 |
| Legal Documentation | Qualitative | 4 | 2 |
| Financial Plan | Qualitative | 4 | 0 |
| TOTAL | 6,857 | 100 | 59 |

1003-B

| Your Financial Security Score: 59 |
|---|

1004

1005

TOP 3 WAYS TO IMPROVE FINANCIAL SECURITY SCORE

1. Purchase Life Insurance
2. Increase amount in your Emergency Funds
3. Prepare a financial plan

Figure 10

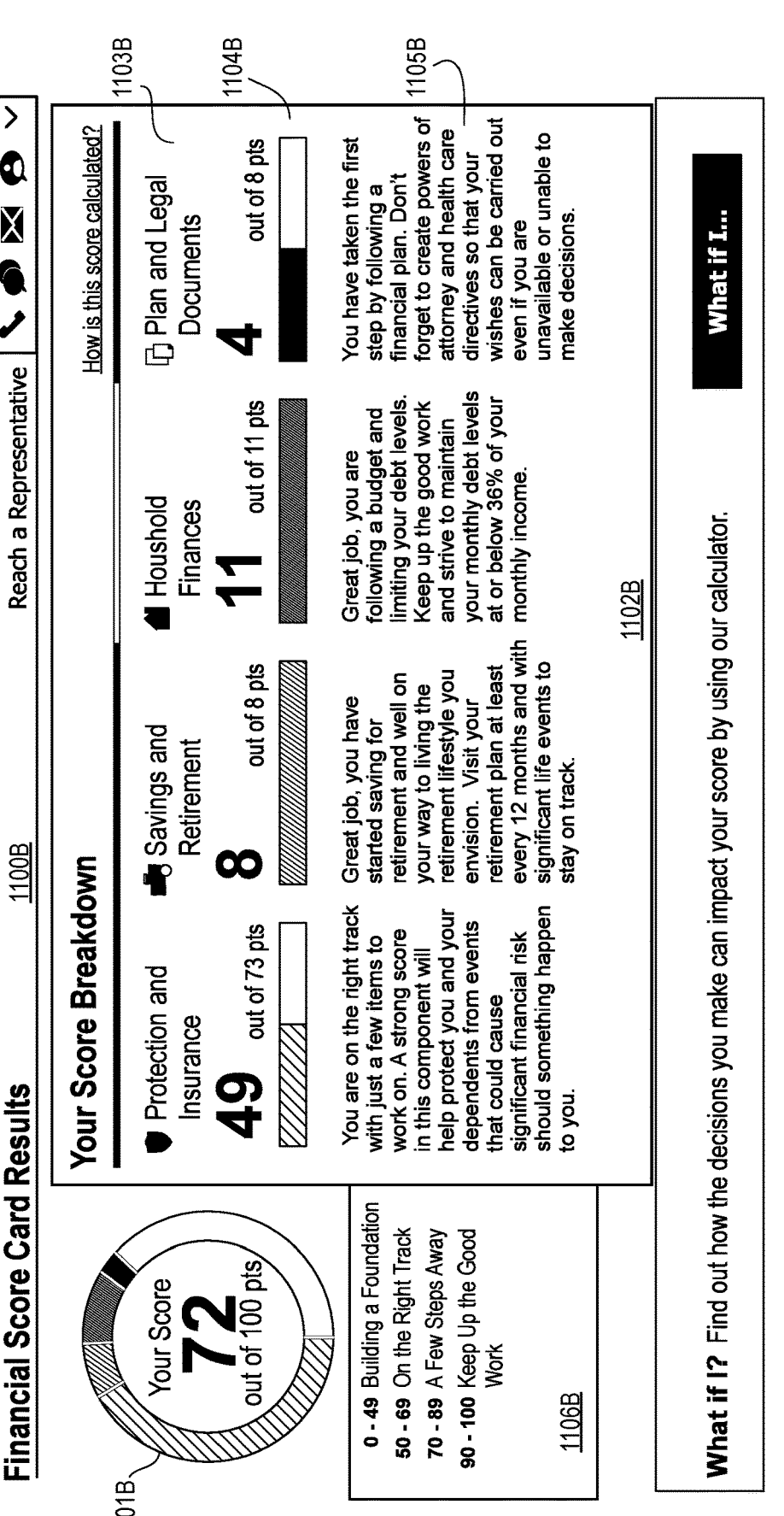

Financial Score Card Results    1100B    Reach a Representative

Your Score Breakdown    How is this score calculated?

Protection and Insurance
49 out of 73 pts

You are on the right track with just a few items to work on. A strong score in this component will help protect you and your dependents from events that could cause significant financial risk should something happen to you.

Savings and Retirement
8 out of 8 pts

Great job, you have started saving for retirement and well on your way to living the retirement lifestyle you envision. Visit your retirement plan at least every 12 months and with significant life events to stay on track.

Houshold Finances
11 out of 11 pts

Great job, you are following a budget and limiting your debt levels. Keep up the good work and strive to maintain your monthly debt levels at or below 36% of your monthly income.

Plan and Legal Documents
4 out of 8 pts

You have taken the first step by following a financial plan. Don't forget to create powers of attorney and health care directives so that your wishes can be carried out even if you are unavailable or unable to make decisions.

1103B
1104B
1105B

Your Score
72 out of 100 pts

0 - 49 Building a Foundation
50 - 69 On the Right Track
70 - 89 A Few Steps Away
90 - 100 Keep Up the Good Work 1101B
1106B

1102B

What if I...

What if I? Find out how the decisions you make can impact your score by using our calculator.

Aggregate Transaction Data 1500

Augment Transaction Data 1510

Identify Pattern of Repeated Transactions 1520

Define Discretionary Spending Habit 1530

FINANCIAL SECURITY INDICATOR

CROSS REFERENCE TO RELATED APPLICATIONS

The present application is a continuation of U.S. patent application Ser. No. 17/181,198, filed Feb. 22, 2021, which is a continuation of U.S. patent application Ser. No. 15/211, 874 (now U.S. Pat. No. 10,956,879), filed Jul. 15, 2016, which is a continuation-in-part of U.S. patent application Ser. No. 14/284,132 (now abandoned), filed May 21, 2014, which is a continuation-in-part of U.S. patent application Ser. No. 13/833,182 (now abandoned), filed Mar. 15, 2013, all of which are incorporated herein by reference in their entirety.

BACKGROUND

When a financial institution is considering its relationship with their customers, the financial institution should realize the benefits to promoting the financial security of their customers. A financially secure customer is obviously beneficial to the customers themselves. In addition, a financially secure customer may also provide beneficial results for the financial institution. For instance, the financial institution may benefit because financially secure customers may tend to deposit larger sums into their accounts as their wealth increases. Also, financially secure customers may be beneficial to the financial institution because financially secure customers may be better situated and more inclined to buy more financial products from the financial institution.

SUMMARY

Therefore, the present disclosure is directed to a method, system, apparatus and/or non-transitory computer readable medium for providing a user with guidance.

According to an aspect of the present disclosure, a method is disclosed for providing a user with guidance, the method comprising: analyzing, by a processor, a historical dataset of the user to identify recurring events, where each recurring event is modeled as an event type and a set of contextual parameters, the set of contextual parameters comprising a location parameter; determining, by the processor, a suggested modification for modifying one or more of the recurring events to improve a user security score; transmitting, by the processor, the suggested modification to a remote user device for presentation to the user via an interactive user interface; receiving, by the processor, a user monitoring request to monitor user progress in achieving the suggested modification; and in response to receipt of the user monitoring request, initiating monitoring, by the processor, the suggested modification, wherein monitoring the suggested modification comprises, for each recurring event in the suggested modification: periodically transmitting user location requests to the remote user device that activate GPS circuitry on the remote user device; receiving and updating a current location of the remote user device in response to the user location requests; comparing the current location of the remote user device to the location parameter to determine whether the current location of the remote user device is within range of a target location defined by the location parameter; and transmitting a reminder message to the remote user device reminding the user of the suggested modification based on an initial determination that the current location of the remote user device is within range of the target location.

According to another aspect, an apparatus is disclosed for providing guidance to a user, the apparatus comprising: a memory; and a processor in communication with the memory, the processor configured to: analyze a historical dataset of the user to identify recurring events, where each recurring event is modeled as an event type and a set of contextual parameters, the set of contextual parameters comprising a location parameter for a target location; determine a suggested modification for modifying one or more of the recurring events to improve a user security score; transmit the suggested modification to a remote user device for presentation to the user via an interactive user interface; receive a user monitoring request to monitor user progress in achieving the suggested modification; and in response to receipt of the user monitoring request, monitor the suggested modification, wherein the processor is configured to, for each recurring event in the suggested modification: periodically transmit user location requests to the remote user device that activate GPS circuitry on the remote user device; receive and update a current location of the remote user device in response to the user location requests; compare the current location of the remote user device to the location parameter to determine whether the remote user device is within range of the target location; and transmit a reminder message to the remote user device reminding the user of the suggested modification based on an initial determination that the remote user device is within range of the target location.

In yet another aspect, a non-transitory computer readable medium is provided, comprising processor executable instructions, which when executed by the processor cause the processor to: analyze a historical dataset of the user to identify recurring events, where each recurring event is modeled as an event type and a set of contextual parameters, the set of contextual parameters comprising a location parameter of a target location; determine a suggested modification for modifying one or more of the recurring events to improve a user security score; transmit the suggested modification to a remote user device for presentation to the user via an interactive user interface; receive a user monitoring request to monitor user progress in achieving the suggested modification; and in response to receipt of the user monitoring request, monitor the suggested modification, wherein the processor is configured to, for each recurring event in the suggested modification: periodically transmit user location requests to the remote user device that activate GPS circuitry on the remote user device; receive and update a current location of the remote user device in response to the user location requests; compare the current location of the remote user device to the location parameter to determine whether the remote user device is within range of the target location; and transmit a reminder message to the remote user device reminding the user of the suggested modification based on an initial determination that the remote user device is within range of the target location.

Other systems, methods, and features will be, or will become apparent to one with skill in the art upon examination of the following figures and detailed description. It is intended that all such additional systems, methods, and features included within this description, be within the scope of the disclosure, and be protected by the following claims.

BRIEF DESCRIPTION OF THE DRAWINGS

The present invention may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 1 illustrates a table describing a financial institution's core beliefs for achieving financial security;

FIG. 3A illustrates an exemplary table of inquiries related to the first core belief illustrated in FIG. 1;

FIG. 3B illustrates an exemplary table of home insurance related data;

FIG. 3C illustrates exemplary tables of automobile insurance related data;

FIG. 3D illustrates an exemplary table of life insurance related data;

FIG. 3E illustrates an exemplary table of Long Term Care insurance related data;

FIG. 3F illustrates an exemplary table of disability insurance related data;

FIG. 4 illustrates an exemplary table of inquiries related to the second core belief illustrated in FIG. 1;

FIG. 5 illustrates an exemplary table of inquiries related to the third core belief illustrated in FIG. 1;

FIG. 6 illustrates an exemplary table of inquiries related to the fourth core belief illustrated in FIG. 1;

FIG. 7 illustrates an exemplary table of inquiries related to the fifth core belief illustrated in FIG. 1;

FIG. 8 illustrates an exemplary table of inquiries related to the sixth core belief illustrated in FIG. 1;

FIG. 10 illustrates tables describing information input by the user, and the financial security indicators generated by a financial security tool, according to the present invention;

FIG. 11B depicts an exemplary financial security score card that may be presented to the user.

DETAILED DESCRIPTION

Figure 2:
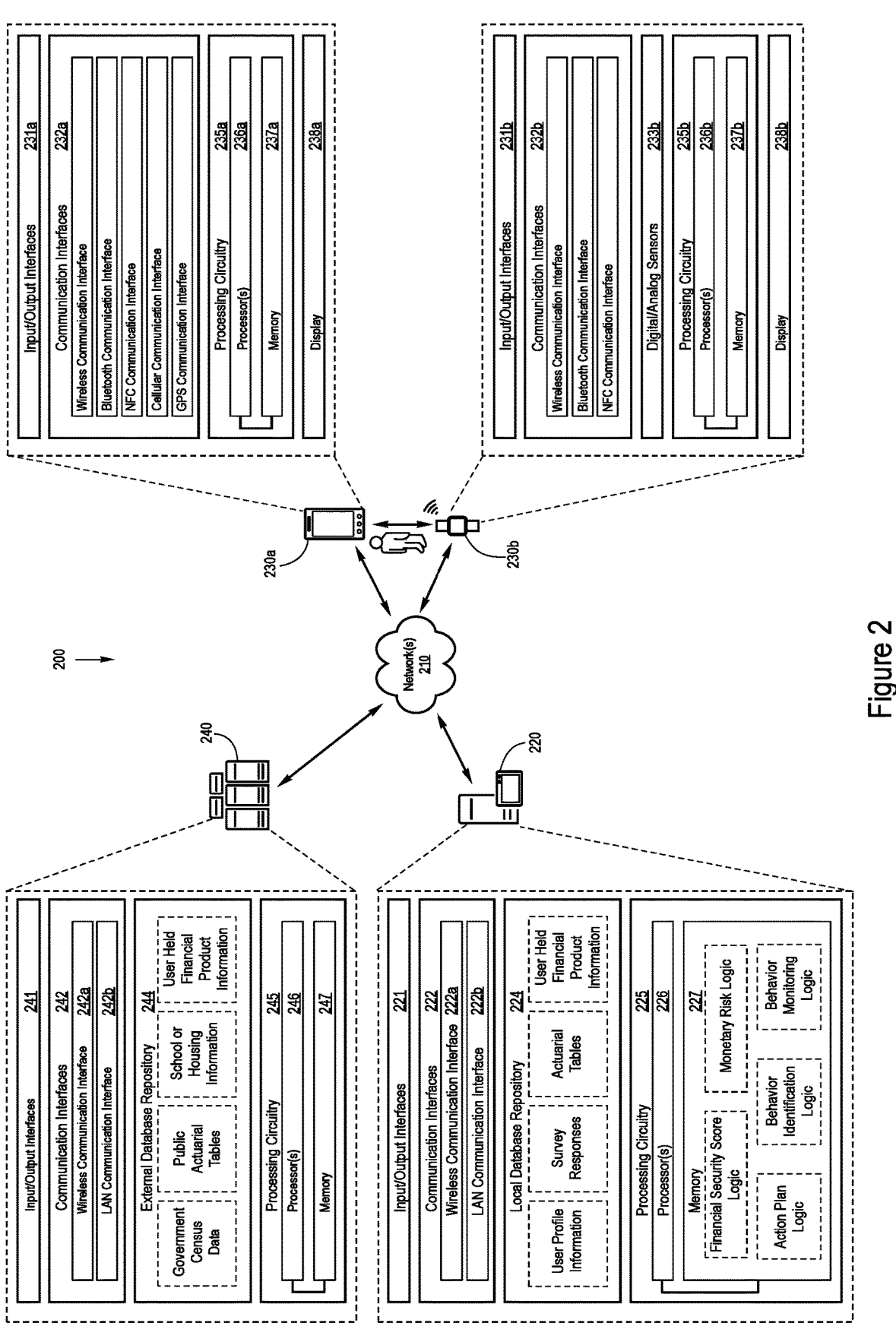
FIG. 2 illustrates an exemplary system for implementing the present invention.

The present invention as described herein may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein.

Providing users with an accurate portrayal of their current level of financial security should be an important goal for any financial institution. From the user's perspective, being able to review an accurate reflection of their current level of financial security keeps the users better informed to make smarter financial decisions and to better plan their financial future. The user may use this information to assess the impact of past decisions, predict the impact of upcoming events, and plan for the impact of future events.

From the financial institution's perspective, providing their users with reports on the user's level of financial security may help the users become more financially secure. Financially secure users may be more likely to deposit more of their wealth with their financial institution, and financially secure users may be more likely to buy financial products from their financial institution. Both these results are beneficial to the financial institution.

Now in order to provide users with an accurate portrayal of their current level of financial security, the financial institution may develop a specific set of core beliefs that the financial institution believes will allow their users to achieve an adequate level of financial security.

FIG. 1 illustrates a table 100 that includes an exemplary set of core beliefs that may be adopted by the financial institution. The core beliefs illustrated in table 100 are provided for exemplary purposes only, as a financial institution may adopt a different set of core beliefs comprised of a fewer or greater number of core beliefs.

The first core belief stated in table 100 asks the user to protect their life, loved ones and their possessions. Put another way, the first core belief asks whether the user has adequate insurance coverage.

The second core belief stated in table 100 asks the user to spend less than they earn. Put another way, this second core belief asks whether the user has an adequate monthly budget. The present invention contemplates referencing the user's budget in measurable units of time including, but not limited to, a day, multiple days, a week, multiple weeks, a month, multiple months, a year, multiple years, or other measurable units of time.

The third core belief stated in table 100 asks the user to save enough money for emergencies. Put another way, this third core belief asks whether the user has adequately saved up for emergency situations that may occur in the user's life.

The fourth core belief stated in table 100 asks the user to save for retirement. Put another way, this fourth core belief asks whether the user has adequately planned for retirement.

The fifth core belief stated in table 100 asks the user to prepare a will, as well as any other important legal documents. Put another way, this fifth core belief asks whether the user has adequately prepared wills and other important legal documents.

The sixth core belief state in table 100 asks the user to build their net worth by outlining a financial plan and updating the financial plan as the user's situation changes. Put another way, this sixth core belief asks whether the user has accumulated an adequate amount of net worth, and whether the user has updated their financial plan.

By adhering to the set of core beliefs outlined by the financial institution, the financial institution believes that their users will be able to achieve an adequate level of financial security.

Now, in order to determine a user's actual level of financial security, the financial institution may want to ask their users to respond to a series of questions related to the financial institution's adopted set of core beliefs. One example of this process is generally illustrated in FIG. 9B, but additional aspects not present in the figures are described in greater detail below. If the user is married, questions will be asked for both the user and their spouse in order to provide a household view. The questions may be pre-populated with information the financial institution already knows about the user, making it more convenient for the user. In addition to information gathered based on the use of products and services with the financial institution itself, the user may also be provided with the ability to link or otherwise associate an account held by the user with a third party service provider. For example, the financial institution may have a server access a third party web site, using login credentials provided by the user, scrape or otherwise pull relevant user data from the third party website, store the user information locally at the financial institution server, and populate the appropriate question field with that data. The third party provider may also facilitate this process by providing a web interface to access user information stored in a database, which the financial institution server may use to more readily access the user information. The user may also be given the ability to change the value of questions which are pre-populated with user information if, for example, the user believes the information to be inaccurate.

Also for the user's convenience, the questionnaire may not need to be completed in one session, and the entered user responses may be stored so that the questionnaire may be resumed and completed at a later time. The user responses may be saved automatically, at known intervals, or based upon certain user actions. Furthermore, as the user responds to the questions and the responses are recorded, the user may be provided with an indication of the progress made towards completion of the questionnaire, for example, in the form of a percentage. The progress may be updated as each question is answered, or where the questionnaire is divided into different sections, the user's progress may be considered with respect to a section as a whole.

In some embodiments, the questionnaire may be designed such that the questions are to be completed in order. In such cases, it may be desirable to control the order of the questions, to incentivize the user to start, continue, and complete the questionnaire. For example, certain basic or general questions may be placed towards the beginning. The user will likely have little or no difficulty responding to these questions and may only spend a short period of time completing this section, but the user's progress, if based on the number of questions answered, may increase significantly providing the user with motivation to continue. Likewise, relatively easy questions may be placed towards the end of the questionnaire to incentivize completion. For similar reasons, more difficult and thought provoking questions may be placed towards the middle of the questionnaire to deter the user from abandoning the process.

Information collected from the user's response to the questions may be stored in a repository, managed by a financial institution server, which may better inform other systems at the financial institution. In this way, the repository may be referenced by one or more systems within the financial institution to create a robust customer profile that will enhance service and marketing. Based on this information, the financial institution server may choose to generate a financial security score that is applicable to the user and serves as an interpretation of the user's level of financial security as calculated by the financial institution. Hereinafter, reference to the financial institution is generally intended to identify the server infrastructure at the financial institution, which is described in further detail below. The financial security score may be broken down into constituent financial security score portions, which in turn may be associated with one or more questions or sections of the questionnaire. In this way, the financial security score portions may also align with the core beliefs adopted by the financial institution, and can be seen as reflecting a particular aspect or feature of the applicable core belief.

In some embodiments, the financial security score and the individual financial security score portions may be generated in real-time as the questions are answered. It may be necessary or at least desirable to have a minimum number of questions answered before a financial security score or score portion may be generated. Additionally or alternatively, there may be specific questions or sets of questions that need to be answered before a financial security score or score portion may be generated. And where the questions are grouped into sections, a financial security score or score portion may only be generated after particular sections or particular questions within a section have been answered. Further, in other embodiments, it may be necessary to have the user complete all answers before a financial security score or score portion is generated.

In some embodiments, the user may also be presented with a predicted financial security score, which the user may compare with the generated financial security score. As questions are answered and the financial security score portions are generated, the user is able to actively compare the generated financial security score with the predicted financial security score. Where there is a minimum required set of questions to be answered, the predicted financial security score may be displayed while the generated financial security score is not. The predicted financial security score is determined based on known data for the average user and thus remains static throughout the survey inquiry. As the user proceeds through the questionnaire, the generated financial security score will constantly be adjusted and may ultimately be greater than, less than, or equal to the predicted financial security score. While the above was described with respect to the financial security score as a whole, the user may also be presented with predicted financial security score portions corresponding to one or more of the individual financial security score portions.

The financial institution may also generate a calculated risk amount based on the user's responses to the questions that identifies a monetary amount of risk associated with the user for each core belief, or a particular aspect or feature of the core belief. In addition or alternatively, the financial security score and the calculated risk amount may be generated based on additional information, for example industry data related to an applicable core belief or feature thereof, on top of the user's responses to the questions. Further description of the methods and processes the financial institution utilizes in generating the financial security score and the calculated risk amount is provided below.

The financial institution may also provide the user with feedback regarding their financial security score, for example, in the form of a financial security score card that provides an explanation of what the score means and how it was calculated, which may help inform the user regarding their financial security and empower them to take action to improve their financial security. The financial institution may also provide the user with one or more suggestion for the user to improve their financial security score, and may provide an explanation as to why taking such action would be significant, presenting the user with the quantitative or qualitative effect that the action may have on the user's financial security score. The financial institution may suggest specific actions that the user may take (e.g., suggest the purchase of a particular financial product) or generate an action plan that the user may follow to help improve their financial security score. The financial institution may also provide the user with tools to help the user to complete the suggested actions.

The action plan generated by the financial institution may be personalized to the user, for example, taking into account the current financial state and observed behavioral patterns of the user. The action plan, for instance, may suggest different behavioral modifications (e.g., changes in a user's discretionary spending habits) that the user may make to improve the user's financial security score. The financial institution may also provide the user with tools to help complete the action plan and track the user's progress in this regard. For example, when suggesting behavioral modifications to the user, the financial institution may provide the user with tools to monitor particular user behavior (e.g., monitor their spending) and provide proactive advice to the user regarding this behavior (e.g., provide real-time notifications to avoid certain transactions).

The financial institution may also leverage the financial security score to help the user make sound financial decisions. The financial institution may use the financial security score in a predictive capacity, for example, to help a user reach certain goals or assess the impact of certain life events. The financial institution may present the user with information regarding their financial security score over different communication pathways, and may even integrate the financial security score into various interactive contexts (e.g., an online shopping experience of a user).

In addition, the financial institution may ask the user how financially secure they feel, to contrast against their calculated financial security. Some users are found to be overly confident about their level of financial security, while others are more worried than they should be. Knowing the feeling of financial security provides the financial institution with an emotional segmentation dimension so that the financial institution may take this into account when communicating with the user in the future.

The functionality described above may be provided by a financial security tool developed by the financial institution. FIG. 2 illustrates a system 200 including a financial institution server 220, one or more public or private third-party servers 240, one or more user communication devices 230, illustrated in the form of a mobile smartphone 230a and a smart watch 230b, and one or more network(s) 210 for allowing communication of information data between the user communication devices 230 (i.e., mobile smartphone 230a and smart watch 230b), the financial institution server 220, and the third-party servers 240. Although a mobile smartphone 230a and smart watch 230b are identified as exemplary user communication devices 230, other types of communication devices may be used, including, but not limited to, a laptop computer, personal computer, tablet, personal digital assistant (PDA), or other similar communication device.

The financial institution server 220 may be provided with various input/output interfaces 221, communication interfaces 222 (e.g., a wireless communication interface 222a or LAN communication interface 222b), and a local database repository 224, which may communicate with processing circuitry 225 that includes one or more processors 226 and memory 227. The financial institution server 220 may utilize the communication interfaces 222 to communicate over the communication network(s) 210 as mentioned above. The local database repository 224 may store user profile information, survey or questionnaire responses, actuarial tables and user held financial product information. The user held financial product information may include information regarding various products and services that the user has with the financial institution (e.g., insurance coverage information, banking account information, credit card information, or the like), which may include transaction data for the different products and services. The user held financial product information may also include a user budget and/or budget history, which the user may have created with the financial institution. The memory 227 may contain logic for implementing the financial security tool to provide the functionality described below. For example, the memory may include financial security score logic and monetary risk logic for calculating a user's financial security score and monetary risk amounts. The memory 227 may also include action plan logic, user behavior identification logic, and behavior monitoring logic to generate a personalized action plan for the user, which may include suggested behavioral modifications, and allow the user to monitor their behavior.

The third-party servers 240 may be provided with various input/output interfaces 241, communication interfaces 242 (e.g., a wireless communication interface 242a or LAN communication interface 242b), and an external database repository 244, which may communicate with processing circuitry 245 that includes one or more processors 246 and memory 247. The third-party servers 240 may utilize the communication interfaces 242 to communicate over the communication network(s) 210 as mentioned above. The third party servers 240 may be public servers where the external database repository 244 may store government census data, public actuarial tables, school or housing information, or the like, or the third party servers 240 may be private servers where the external database repository 244 may store user profile information and/or user held financial product information. The user held financial product information may include information regarding various products and services that the user has with different third party providers (e.g., credit card information, mobile payment information, or the like), which may include transaction data for the different products and services. The user held financial product information may also include a user budget and/or budget history, which the user may have created with the third party providers. As mentioned above, the third-party servers 240 may communicate with the financial institution server 220 and user communication devices 230 via the communication network 210 and may do so by utilizing the different communication interfaces 222.

The mobile smartphone 230a may be provided with a display 238a (e.g., an LCD display, an LED display, or the like), various input/output interfaces 231a (e.g., a keypad, a capacitive touch screen, or the like), and communication interfaces 232a (e.g., a wireless communication interface, Bluetooth communication interface, near field communication (NFC) interface, cellular communication interface, or GPS communication interface), which may communicate with processing circuitry 235a that includes one or more processors 236a and memory 237a. The mobile smartphone 230a may utilize the communication interfaces 232a to communicate over the communications network(s) 210 as mentioned above, or may utilize the communication interfaces 232*a* to communicate directly with other user communication devices 230 (e.g., the smart watch 230*b*). The memory 237*a* may contain logic for implementing the financial security tool to provide the functionality described below.

The smart watch 230*b* may be provided with a display 238*b* (e.g., an LCD display, an LED display, or the like), various input/output interfaces 231*b* (e.g., a keypad, a capacitive touch screen, or the like), communication interfaces 232*b* (e.g., a wireless communication interface, Bluetooth communication interface, near field communication (NFC) interface, or cellular communication interface), and one or more digital or analog sensors 233*b*, which may communicate with processing circuitry 235*b* that includes one or more processors 236*b* and memory 237*b*. The smart watch 230*b* may utilize the communication interfaces 232*b* to communicate over the communications network(s) 210 as mentioned above, or may utilize the communication interfaces 232*b* to communicate directly with other user communication devices 230 (e.g., the mobile smartphone 230*a*). The sensors 233*b* may be able to capture biometric information regarding the user wearing the smart watch 230*b*, including the temperature, heart rate, respiration rate and blood pressure of the user. The smart watch 230*b*, for instance, may capture this information using a temperature sensor (i.e., a thermometer), an optical heart rate sensor, a galvanic skin response senor, a bio-impedance sensor, or the like. The memory 237*b* may contain logic for implementing the financial security tool to provide the functionality described below.

Further, the one or more network(s) 210 may be a cellular network, including standards-based networks (e.g., 2G, 3G, Universal Mobile Telecommunications System (UMTS), GSM® Association, Long Term Evolution (LTE)™, or more), WiMAX, Bluetooth, near field communication (NFC), WiFi (including 802.11 a/b/g/n/ac or others), WiGig, Global Positioning System (GPS) networks, and others available at the time of the filing of this application or that may be developed in the future. Further, the network(s) may be a public network, such as the Internet, a private network, such as an intranet, or combinations thereof, and may utilize a variety of networking protocols now available or later developed including, but not limited to TCP/IP based networking protocols.

In some embodiments, the financial security tool may be incorporated into the financial institution's website that is running on the financial institution's server 220. In this way, the user may utilize the financial security tool by operating the communication device 230 to access the financial institution's website via the one or more network(s) 210. After accessing the financial institution's website, the user may interact with the financial security tool by receiving, from the financial security tool, one or more inquiries about the adequacy of the user's financial security that are displayed as part of the financial institution's website on the user's communication device 230. The user may then input responses to the inquiries into the communication device 230. The communication device 230 may then transmit the user's responses to the financial institution's server 220 via the one or more network(s) 210. Once the financial security tool running on the financial institution's server 220 as part of the website receives the user's response, the financial security tool may perform an analysis on the response according to one or more of the processes described herein.

The financial security tool running on the financial institution's server 220 may also provide the user with feedback regarding their financial security score along with one or more suggestions for the user to improve their financial security score as part of the website. This feedback may be provided as a financial security score card, which the user may interact with using their communication device 230 to obtain an explanation of what their financial security score means and how it was calculated. The score card may be personalized to the user and may include a personalized action plan for the user to follow, which in some instances may suggest different behavioral modifications that the user may make to improve the user's financial security score. The user may be able to input selections of particular actions to take, or particular behavioral modifications to monitor, into the communication device 230. The user selections may then be sent to the financial institution's server 220 via the one or more network(s) 210.

In response to the user selections, the financial security tool running on the financial institution server 220 may initiate the selected actions (e.g., initiate the purchase of an insurance policy or the transfer funds between user accounts) or begin monitoring selected behavioral modifications. In monitoring the selected behavioral changes, the financial security tool may track the location of the communication device 230, for example, by periodically requesting the location of the communication device 230 as part of the website running on the financial institution's server 220. The webpages served by the website, for example, may be capable of invoking the geolocation functionality. Hyper Text Markup Language 5 (HTML5), for instance, provides the HTML Geolocation API, which allows a website to determine the current geographical position of the user (as well as their heading and speed) and automatically update the position of the user as they move. The financial security tool may use this location information to determine whether the user is engaging in the behavior in question, and may present the user with reminder messages and/or confirmation messages as part of the website, which the user may view using their communication device 230. In addition or alternatively, in some embodiments the financial security tool may be downloaded onto the user's communication device 230 as a program that is executed by the communication device 230. The financial security tool may be transmitted to the communication device 230 from a remote server (e.g., the financial institution's server 220), via the one or more network(s). For example, the financial security tool may be a program comprised of a set of instructions that are executed by a processor of the communication device 230 in order to accomplish one or more of the processes described herein. In this way, the user may directly interact with the financial security tool on the user's communication device 230. Even so, in some embodiments, the financial security tool may be partitioned such that part of the financial security tool is being executed on the communication device 230, while another part of the financial security tool is being executed on the financial institution server 220. For example, a portion, or all, of the financial security tool may be downloaded onto the communication device 230 such that the downloaded portion of the financial security tool is executed on the communication device 230. The financial security tool may be executed on the communication device 230 to ask the user a series of questions related to the adequacy of the user's current financial situation, and then receive the user's responses to such inquiries. Then, the financial security tool may be executed to transmit the user's responses to the financial institution server 220. On the financial institution server 220, another portion of the financial security tool may be executed to receive the user's responses that are transmitted from the communication device 230. The financial security tool may be further executed on the financial institution server 220 to generate a financial security score and/or a calculated monetary risk amount for the user based on at least the user's responses. The generated financial security score and/or the calculated monetary risk amount may then be communicated back to the user.

The financial security tool may be further executed on the financial institution server 220 to provide feedback to the user regarding their financial security score and generate a financial security score card, which may be transmitted to the communication device 230. The financial security score card may include a personalized action plan for the user to follow, which may suggest behavioral modifications that the user may undertake, to improve the user's financial security score. The financial security tool may be executed on the financial institution server 220 to aggregate and analyze historical user data to identify the suggested behavioral modifications. The financial security tool may be further executed on the communication device 230 to present the score card and allow the user to select particular actions to take or suggested behavioral changes to monitor. The user selections may be transmitted back to the financial institution server 220, where the financial security tool may be further executed to take the selected actions or monitor the selected behavioral changes. In monitoring the selected behavioral changes, the financial security tool may be executed on the financial institution server 220 to periodically request location information from the communication device 230 or the communication network(s) 210 to which it is connected and use this information to determine whether the user is engaging in the behavior in question. The financial security tool may also be executed on the financial institution server 220 to transmit reminder messages and/or confirmation messages regarding the behavior in question to the communication device 230, where the financial security tool may be executed to present the messages to the user.

Further description regarding the financial security tool, the inquiries to the user, the user's response, the analysis of the user's response in order to generate the financial security score and/or the calculated monetary risk amount, the generation of feedback regarding the financial security score, including the generation of a personalized action plan, the identification of suggested behavioral changes, and the monitoring of the suggested behavioral changes is provided below.

It is noted that the financial institution tool may generate the user's overall financial security score by summing one or more financial security score portions. With regards to each financial security score portion, the financial institution tool may determine the maximum value that the user may achieve, in terms of points, for that particular financial security score portion. The tool may then assign the number of points that the user has actually achieved for that particular financial security score portion. By adjusting the maximum possible value given to a particular financial security score portion, the financial institution tool is able to adjust the relative weight given to a particular aspect or feature of a core belief when generating the user's overall financial security score.

In some embodiments, the number of points allocated to each individual financial security score portion may be fixed or static, and may be determined without any regard to specific user information. In other embodiments, the number of points available for each individual financial security score portion may also be fixed or static, but they may be determined based on user specific information. For example, the number of points allocated to a particular financial security score portion may be based on certain basic demographic properties like the user's life stage, marital and parental status and will not change for a given user. In this way, the overall financial security score that is generated is personalized to the particular user.

In other embodiments, the number of points available for each individual financial security score portion may be dynamically adjusted, for example and without limitation, based on information collected from the user's responses to the questionnaire. For example, the maximum possible number of points given to a particular financial security score portion may be determined based on the weight of the monetary risk calculated for that score portion relative to the user's overall monetary risk amount. The financial institution tool may generate the user's overall monetary risk amount, by summing one or more monetary risk amount portions. The number of points allocated to a particular score portion may be determined based on the ratio between the calculated monetary risk for a particular score portion and the user's overall monetary risk amount. As the user responds to the questionnaire and the calculated risk amounts are generated, the number of points allocated to a particular score portion may continuously change. Each adjustment in turn may affect the user's overall financial security score. Furthermore, as the calculated risk is based on the user's responses to the questionnaire, this method of weighting offers the user a uniquely personalized financial security score.

In yet other embodiments, various methods of weighting may be combined. As described, each financial security score portion may be calculated separately based on a feature or aspect believed to be representative of a corresponding core belief. While the separate features or aspects may be associated with a corresponding core belief, they may also be considered based on different categorical distinctions and separately grouped. As one example, the grouping of the financial security score portions may be based on whether each score portion relates to protection of persons and property, personal spending, borrowing and saving habits, or is some type of qualitative assessment.

A different method of weighting may be applied to each group. Qualitative assessments, for example, may receive a fixed number of points, for example, by allocating four possible points to each corresponding financial security score portion. Spending, borrowing, and saving habits may be weighted based on the user's general demographic information, and protection for persons and property may be dynamically weighted based on the calculated monetary risk associate with each score portion.

More generally, the financial security score can be represented on various scales, for example and without limitation, 0-10, 0-100, or 0-1000. Depending on the resolution desired to be able to properly adjust the weight given to each financial security score portion, the appropriate scale may be chosen. Additionally, any financial security score may simply be normalized to fit a desired score range. With regards to how points are assigned to each financial security portion and how the corresponding monetary risk is calculated, further description is provided below.

FIG. 3A illustrates a table 300A including a series of questions that may be utilized by the financial security tool in order to inquire a user on topics related to the first core belief illustrated in FIG. 1. In this way, the financial security tool may generally ask the user whether they have adequate insurance coverage in accordance with the first core belief.

More specifically, the financial security tool may ask the user whether the user has property insurance. Based on the user's response, the financial security tool may assign points to a property insurance portion of the user's financial security score. In some embodiments, the financial security tool may score the property insurance portion of the user's financial security score by assigning a number of points out of a maximum possible score value. The number of points assigned may be based on the adequacy of the user's property insurance coverage as provided in the user's response. For example, if the user's response indicates the user has no property insurance, the financial security tool may assign the user a score of 0 out of the maximum possible score (e.g., 0 out of 10), or in some embodiments even subtract from the user's overall financial security score. If the user's response indicates that the user's current amount of property insurance coverage at least currently owns some form of property insurance while also owning property, then the financial security tool may assign the user a non-zero score out of the maximum possible score (e.g., 5 out of 10). In some embodiments, the extent of the user's property insurance may have to at least cover the current value of the user's property holdings in order for the financial security tool to assign a non-zero score for the property insurance portion of the user's financial security score.

Or in some embodiments, the financial security tool may set a predetermined minimum amount, or minimum percentage, of the user's property holdings that should be covered under the user's property insurance plan in order to receive a non-zero score for the property insurance portion of the user's financial security score. For example, any property insurance coverage where the user will be compensated at least $100,000, or 80% of the value of the user's property holdings, may receive a non-zero score. In this way, the greater the coverage offered by the user's property insurance plan, the greater the property insurance portion of the user's financial security score may be.

The financial security tool may assign the maximum possible score (e.g., 10 out of 10) related to the property insurance portion of the user's financial security score when the amount of the user's property insurance coverage reaches at least a set amount, or a set percentage amount, of the current value of the user's property holdings.

In some embodiments, the financial security tool may assign additional points to the property insurance portion of the user's financial security score if the user is found to have a home mortgage. Similarly, if the user is a renter, the financial security tool may assign points to the user if the user has renters insurance. Having any type of home insurance is a positive indicator that the user will be financial secure in case of an incident occurring that damages the user's home and home belongings. The financial security tool may consider the user's property insurance plan in terms of the monetary amount of the coverage, and/or other terms of the property insurance plan coverage (e.g., whether the property insurance plan includes flood or natural disaster type coverage, and whether the property insurance includes liability insurance coverage).

In addition to generating the financial security score as described above, the financial security tool may also calculate a monetary risk amount associated with the user's adequacy of property insurance coverage. In some embodiments, the financial security tool may reference average property insurance premiums for homeowners, and average property insurance premiums for renters (e.g., renter's insurance), as illustrated in table 300B of FIG. 3B. Table 300B further illustrates that the average premium figures may be obtained by the financial security tool to be specific to the user's location (e.g., user's home state, county, city, township, etc.).

In this way, the user's property insurance portion of the user's monetary risk amount may be a weighted value of the average property insurance premium that corresponds to the user. For instance, if the user's actual home value is within a predetermined amount (e.g., $1000) of the average home value corresponding to the user (e.g., average home value in the user's location), then the user's property insurance portion of the user's monetary risk amount may be a non-weighted value of the average property insurance premium that corresponds to the user. In this scenario, if the user resides in Alabama and the user's actual home value is worth $153,000 (i.e., within the predetermined range of the average home price), then the user's property insurance portion of the user's monetary risk amount may be the non-weighted value of $987 if the user is a homeowner, and $216 if the user is a renter.

If the user's actual home value is not within the predetermined amount range from the average home price corresponding to the user, then the user's property insurance portion of the user's monetary risk amount may be a weighted value of the average property insurance premium that corresponds to the user. For example, if the user resides in Alabama and the user's actual home value is worth $200,000 (i.e., not within the predetermined range of the average home price), then the user's property insurance portion of the user's monetary risk amount may be calculated by the financial security tool by multiplying a weighting value to the average homeowner's property insurance premium ($987) if the user is a homeowner, or to $216 if the user is a renter. The weighting value may increase as the user's actual home value is found to be increasingly more than the average home price, and the weighting value may decrease as the user's actual home value is found to be closer to the average home price and below.

Alternatively, the user's property insurance portion of the user's monetary risk amount may be calculated by the financial security tool by adding a predetermined offset amount (e.g., $3) to the average premium amount corresponding to the user for every $X (e.g., $1000) the user's actual home value varies from the corresponding average home value (e.g., $3 is added to the average premium amount for every $1000 difference in the user's actual home value and the average home value). For example, if the user resides in Alabama and the user's actual home value is worth $200,099 (i.e., $47,000 more than the average home price), then the user's property insurance portion of the user's monetary risk amount may be calculated by the financial security tool by adding ($3)*(47)=$141 to the average homeowner's property insurance premium ($987) to obtain $1128 as the property insurance portion of the user's monetary risk amount if the user is a homeowner. Other offset amounts may be used by the financial security tool.

In addition or alternatively, the property insurance portion of the user's monetary risk amount may be calculated based on leveraging the financial institution's actuarial tables to estimate the likelihood of a property insurance loss, the average cost of that loss, and the deductible amount of the user's property insurance policy.

While not illustrated in table 300A, the financial security tool may also question the user on the adequacy of the user's umbrella insurance policy. If the user's response indicates the user has no umbrella insurance, the financial security tool may assign a minimum score out of a possible maximum score (e.g., 0 out of 5) for the umbrella insurance portion of the user's financial security score. Alternatively, if the user's response indicates that the user has an umbrella insurance policy, the financial security tool may assign a maximum score (e.g., 5 out of 5) for the umbrella insurance portion of the user's financial security score.

In addition to generating the financial security score as described above, the financial security tool may also calculate a monetary risk amount associated with the user's adequacy of umbrella insurance coverage. In order to calculate the umbrella insurance related portion of the user's monetary risk amount, the financial security tool may obtain information describing the premium paid for a particular amount of coverage in an umbrella insurance policy since the premium paid for a particular amount of coverage may serve as an appropriate proxy for the user's monetary risk. Thus, the financial security tool may determine that the premium for umbrella insurance coverage is approximately a fixed rate of $150 per $1,000,000 of coverage. The financial security tool may also inquire the user about their total net worth, which is seen as providing a good assessment of the coverage required for the user's umbrella insurance policy. The financial security tool may then calculate the user's monetary risk amount associated with the adequacy of umbrella insurance coverage, by dividing the user's total net worth by $1,000,000 and multiplying that value by $150.

A similar type of analysis as described above regarding the generation of a financial security score and the calculation of a monetary risk amount, may be applied by the financial security tool when it comes to the user's other types of insurance considered under the first core belief.

For example, the financial security tool may inquire the user on the adequacy of the user's automobile insurance. If the user's response indicates the user has no automobile insurance, while owning an automobile, the financial security tool may assign a minimum score out of a possible maximum score (e.g., 0 out of 7) for the automobile insurance portion of the user's financial security score. Similarly, the greater an amount of the user's automobile insurance coverage is when compared to the value of the user's automobile, the greater the automobile insurance portion of the user's financial security score will be. In some embodiments, the financial security tool may assign points to the automobile insurance portion of the user's financial security score just for the user having automobile insurance.

In some embodiments, the financial security tool may set a predetermined minimum amount, or minimum percentage, of the user's automobile that should be covered in the user's automobile insurance coverage in order to receive a non-zero score for the automobile insurance portion of the user's financial security score. For example, any automobile insurance coverage where the user will be compensated at least $30,000, or 75% of the worth of the user's automobile, may receive a non-zero score. In this way, the greater the coverage offered by the user's automobile insurance plan, the greater the automobile insurance portion of the user's financial security score may be.

The financial security tool may assign the maximum possible score (e.g., 7 out of 7) for the automobile insurance portion of the user's financial security score when the amount of the user's automobile insurance plan covers is at least a set amount, or a set percentage amount, of the current value of the user's automobile.

The financial security tool may consider the user's automobile insurance plan in terms of the monetary amount of the coverage, and/or other terms of the automobile insurance plan coverage (e.g., amount of liability insurance).

In addition to generating the financial security score as described above, the financial security tool may also calculate a monetary risk amount associated with the user's adequacy of automobile insurance coverage. When calculating this automobile insurance portion of the user's monetary risk amount, the financial security tool may, for example, first determine different types of monetary consequences that may result from an automobile accident. For example, FIG. 3C illustrates a table 300C-1 including accident statistics for four different types of automobile accident related damages: bodily injury, property damage, collision damage between automobiles and comprehensive damage. For each type of automobile accident related damage, table 300C-1 includes an average frequency with which such damages occurs in an automobile accident, and the corresponding severity (e.g., monetary consequences) for each type of damage. Based on the frequency and severity data contained in the financial institution's actuarial tables, the financial security tool may calculate a monetary risk amount for each type of automobile accident related damage. Each of the different types of automobile accident related damages are covered by different terms of the user's automobile insurance coverage. The data for filling in the information for table 300C-1 may be obtained from outside sources such as county or state traffic records, and/or insurance industry data. In addition, the information in table 300C-1 may be specific to the user's location. For example, the information in table 300C-1 may be specific to the user's home county or state.

Further, the financial security tool may calculate an age index for different driver age groups, as illustrated in table 300C-2 in FIG. 3C. For each age group, the financial security tool may then reference traffic and accident data to determine a percentage of drivers that were in an accident within a given time frame (e.g., the last year) for the age group. The traffic and accident data may be referenced from sources that are local to the user's location (e.g., based on data from the user's county or state). Based on this information, the financial security tool may then calculate an age index for each age group that may be used as a weighting factor when calculating an age adjusted risk amount for the user. For example, given that the non-weighted total automobile accident related monetary risk amount for the user is $448, this risk amount may be multiplied with an age index weight that corresponds to the user's age to calculate the user's age adjusted risk amount. So if the user is 23 years old, the financial security tool may multiply $448 by the age index 1.69, in order to obtain the age adjusted risk amount of $757 for the 23 year old user. In this way, the financial security tool may calculate the automobile insurance related portion of the user's monetary risk amount.

As another example, table 300A illustrates that the financial security tool may inquire the user about the adequacy of the user's life insurance. If the user's response indicates the user has no life insurance, the financial security tool may assign the minimum score out of a possible maximum score (e.g., 0 out of 16) for the life insurance portion of the user's financial security score. Similarly, the greater an amount of the user's life insurance coverage is when compared to a calculated need for life insurance of the user, the greater the life insurance portion of the user's financial security score will be.

Similarly, the financial security tool may assign the maximum possible score (e.g., 16 out of 16) for the life insurance portion of the user's financial security score when the amount of the user's life insurance coverage is a set amount, or a set percentage amount, over the user's calculated need for life insurance. In some embodiments, the financial security tool may assign points to the user's life insurance portion of the user's financial security score based on the user simply having life insurance. And in some embodiments, the financial security tool may subtract points from the user's financial security score based on the user not having life insurance.

The user's need for life insurance may be calculated based on one or more attributes of the user, including, but not limited to, the user's age, dependents, actuarial mortality rate, income, net worth, marital status, expenses, weight, history of medical issues, one or more vital statistics, or other health related attribute of the user. Attributes that would contribute to the user having worse health characteristics will be considered to increase the user's need for life insurance. For example, if the user is a 65 year old male smoker with high blood pressure and a history of lung disease, the financial security tool may calculate a higher amount of life insurance is needed. Conversely, attributes that would contribute to the user having better health characteristics will be considered to decrease the user's need for life insurance. For example, if the user is a healthy, 23 year old female with a clean medical record, the financial security tool may calculate a much lower amount of life insurance is needed, if at all.

The financial security tool may consider the user's life insurance plan in terms of the monetary amount of the coverage, and/or other terms of the life insurance plan coverage (e.g., at what age the life insurance amount may be paid out).

In addition to generating the financial security score as described above, the financial security tool may also calculate a monetary risk amount associated with the user's adequacy of life insurance coverage. When calculating this life insurance related portion of the user's monetary risk amount, the financial security tool may, for example, first obtain information identifying a likelihood of mortality within the next year for men and woman of various ages, as illustrated in table 300D in FIG. 3D. Although the mortality rates are described as being the likelihood of mortality within the next year, the likelihood of mortality may be obtained for other time units such as within the next x number of days, x number of months, or x number of years. After obtaining the mortality rate information, the financial security tool may calculate the user's life insurance related portion of the monetary risk amount, by multiplying the user's corresponding likelihood of mortality times the user's income. In some embodiments, the user's marital status and/or the number of dependents the user may have may be taken into consideration to calculate a weighting factor that will be applied to the previously calculated monetary risk amount.

For example, if the user is a 20 year old male, the user's life insurance related portion of the monetary risk amount may be calculated by the financial security tool multiplying the user's corresponding likelihood of mortality rate (0.13%) times the user's yearly income (e.g., $100,000), which results in a monetary risk amount of $130. The monetary risk amount may further be multiplied by a weighting factor based on the user's marital status and number of dependents. It is noted that although the user's yearly income was used in the preceding example, it is within the scope of the present invention to reference the user's income as a monthly income, or other measurable amount.

As another example, table 300A illustrates that the financial security tool may inquire the user about the adequacy of the user's long term care insurance. In some embodiments, if the user's response indicates the user has no long term care insurance, the financial security tool may assign the minimum score out of a possible maximum score for the user's long term care insurance portion of the user's financial security score. Similarly, the greater an amount of the user's long term care insurance coverage is when compared to the user's calculated need for long term care insurance, the greater the user's long term care insurance portion of the user's financial security score will be.

Similarly, the financial security tool may assign the maximum possible score for the user's long term care insurance portion of the user's financial security score when the amount of the user's long term care insurance coverage is a set amount, or a set percentage amount, over the user's calculated need for long term care insurance. In some embodiments, the financial security tool may assign points to the user's long term care insurance portion of the user's financial security score based on the user simply having long term care insurance. And in some embodiments, the financial security tool may subtract points from the user's financial security score if the user does not have long term care insurance.

The user's need for long term care insurance may be calculated based on one or more attributes of the user, including, but not limited to, the user's age, net worth, weight, history of medical issues, one or more vital statistics, or other health related attribute of the user. Attributes that would contribute to the user having worse health characteristics will be considered to increase the user's need for long term care insurance. For example, if the user is a 65 year old male smoker with high blood pressure and a history of lung disease, the financial security tool may calculate a higher amount of long term care insurance is needed. Conversely, attributes that would contribute to the user having better health characteristics will be considered to decrease the user's need for long term care insurance. For example, if the user is a healthy, 23 year old female with a clean medical record, the financial security tool may calculate a much lower amount of long term care insurance is needed, if at all.

The financial security tool may consider the user's long term care insurance plan in terms of the monetary amount of coverage, and/or other terms of the long term care insurance plan (e.g., length of time the long term care insurance benefits will be paid to the user).

In addition to generating the financial security score as described above, the financial security tool may also calculate a monetary risk amount associated with the user's adequacy of long term care insurance coverage. In order to calculate this long term care insurance related portion of the user's monetary risk amount, the financial security tool may first obtain information describing the average long term insurance premiums paid for people of various ages. For example, table 300E in FIG. 3E describes people aged 45 pay on average an annual premium of $465 ($38.75/month) for long term care insurance. Then, the financial security tool may multiply the average premium amount by a predetermined percentage number. For example, if the financial security tool determines that the average premium figures are greater than the true risk to the user, the average premium figures may be multiplied by 50% to calculate the monetary risk amount for the user. So if the user is 45 years old, the user's monetary risk amount would be calculated by the financial security tool by multiplying $465 ($38.75/ month) by 50%, which results in the user's long term care insurance related portion of the user's monetary risk to the user of $232.50 ($19.38). The financial security tool may change the set percentage number based on a determination of whether the average premium amount is believed to be greater, or lesser, than the true risk to the user.

In addition or alternatively, the user's monetary risk amount may be calculated as the cost of experiencing an event that requires long term care, when the user does not have a long term care policy.

As another example, table 300A illustrates that the financial security tool may inquire the user about the adequacy of the user's disability insurance. If the user's response indicates that the user has no disability insurance, the financial security tool may assign the minimum score out of a possible maximum score (e.g., 0 out of 5) for the user's disability insurance portion of the user's financial security score. Similarly, the greater an amount of the user's disability insurance coverage is when compared to the user's income the disability insurance coverage will be replacing, the greater the user's disability insurance portion of the user's financial security score. In some embodiments, the financial security tool may assign points to the user's disability insurance portion of the user's financial security score based on the user simply having disability insurance. And in some embodiments, the financial security tool may subtract points from the user's financial security score if the user does not have disability insurance.

For example, the financial security tool may set a predetermined minimum amount, or minimum percentage, of the user's current income that must be compensated in the user's disability insurance coverage in order to receive a non-zero score for the user's disability insurance portion of the user's financial security score. For example, any disability insurance coverage where the user will be compensated at least $6,000/month, or 60% of the user's monthly income may receive a non-zero score.

Similarly, the financial security tool may assign the maximum possible score for the user's disability insurance portion of the user's financial security score when the amount of the user's disability insurance coverage is a set amount, or a set percentage amount, over the user's current income.

In addition, the financial security tool may also take the user's need for disability insurance into consideration when determining the predetermined minimum amount, or minimum percentage. For example, the predetermined minimum amount, or minimum percentage, may be increased for users with bad health attributes, or for users whose current employment position is unstable. Conversely, the predetermined minimum amount, or minimum percentage, may be decreased for users with good health attributes, or for users whose current employment position is stable. In this way, the predetermined minimum amount, and/or minimum percentage, may be determined based on the user's age, weight, history of medical issues, one or more vital statistics, other health related attribute, or stability of the user's current employment position.

In addition to generating the financial security score as described above, the financial security tool may also calculate the user's monetary risk amount associated with the user's adequacy of disability insurance coverage. The financial security tool may calculate this disability insurance related portion of the user's monetary risk amount by multiplying a likelihood of a disability occurring to the user times an amount of income that would be affected should the disability occur.

For example, FIG. 3F illustrates a table 300F including statistics for a likelihood a user suffers a disability at various stages in the user's life. According to table 300F, a 25 year old user will have a 1.1% of acquiring a disability in the next year. The table 300F also indicates that the 25 year old user will have a 5.5% likelihood of acquiring a disability in the next 5 years. In this way, the financial security tool may reference table 300F when calculating the monetary risk to the user. For example, the one year disability insurance related portion of monetary risk amount for a 25 year old user will be the user's yearly income multiplied by 1.1%. Similarly, the five year disability insurance related portion of monetary risk amount for the 25 year old user will be the user's 5 year income multiplied by 5.5%.

As another example, table 300A illustrates that the financial security tool may inquire the user about the adequacy of the user's health insurance. If the user's response indicates that the user has no health insurance, the financial security tool may assign the minimum score out of a possible maximum score (e.g., 0 out of 17) for the user's health insurance portion of the user's financial security score.

Similarly, the greater an amount of the user's health insurance coverage is when compared to the user's calculated need for health insurance, the greater the user's health insurance portion of the user's financial security score will be. The financial security tool may assign the maximum possible score (e.g., 17 out of 17) related to the adequacy of the user's health insurance coverage when the amount of the user's health insurance coverage is a set amount, or a set percentage amount, over the user's calculated need for health insurance. In some embodiments, the financial security tool may assign points to the user's score based on the user simply having health insurance. Also, in some embodiments the financial security tool may subtract points from the user's financial security score if the user does not have health insurance.

In some embodiments, the user's calculated score may be positively weighted (e.g., multiplied by 75%) if the user is determined to have a stable and/or secure employment position, or negatively weighted (e.g., multiplied by 50%) if the user is determined to have an unstable and/or unsecure employment position.

The user's need for health insurance may be calculated based on one or more attributes of the user, including, but not limited to, the user's age, weight, history of medical issues, one or more vital statistics, or other health related attributes of the user. The user's need for health insurance may also be calculated based on the stability of the user's current employment position. Attributes that would contribute to the user having worse health characteristics, or indicate job instability, will be considered to increase the user's need for health insurance. Therefore, if the user is a 65 year old male smoker with high blood pressure who hasn't held a steady job in 20 years, the financial security tool may calculate a higher amount of health insurance is needed. Conversely, attributes that would contribute to the user having better health characteristics, or indicate job stability, will be considered to decrease the user's need for health insurance. For example, if the user is a healthy, 30 year old female with a clean medical record working at a stable job for past 8 years, the financial security tool may calculate a much lower amount of health insurance is needed. The financial security tool may consider the user's health insurance plan in terms of the monetary value of coverage, and/or other terms of the health insurance plan's coverage (e.g., amount of the deductible, and capped monetary limits on coverage).

In addition to generating the financial security score as described above, the financial security tool may also calculate a monetary risk amount associated with the user's adequacy of health insurance coverage. In order to calculate this health insurance related portion of the user's monetary risk amount, the financial security tool may first obtain data from the health industry that identifies a likelihood (%) of an incidence requiring a major medical procedure occurring in particular age groups. Then the financial security tool may also obtain data from the health industry identifying a cost associated to each type of major medical procedure. In this way, the financial security tool may calculate the user's health insurance related portion of the user's monetary risk amount by taking the likelihood of an incidence occurring for the user, according to the user's age, and multiplying the likelihood with the corresponding cost of the major medical procedure.

FIG. 4 illustrates a table 400 including a series of questions that may be utilized by the financial security tool in order to inquire a user on topics related to the second core belief illustrated in FIG. 1. Generally, the financial security tool may ask the user for data elements to assess if the user is managing their budget responsibly.

More specifically, the financial security tool may ask the user for inputs to calculate the user's total debt to income ratio (e.g., ask the user what the user's total debt is). Based on the user's response, the financial security tool may determine the user's debt related portion of the user's financial security score. For example, the financial security tool may designate a debt to income threshold such that, if the user's debt to income ratio is greater than the threshold, the user is determined to be at risk and no points are assigned to the debt related portion of the user's financial security score. In some embodiments, points may be subtracted from the user's financial security score if the user's debt to income ratio is greater than the threshold. For example, the threshold may be 35%.

Conversely, if the user's debt to income ratio is found to be less than the threshold, the financial security tool may assign points to the debt related portion of the user's financial security score.

In addition to generating the financial security score as described above, the financial security tool may also calculate a monetary risk amount associated with the user's debt to income ratio. For example, the financial security tool may calculate the debt related portion of the user's monetary risk amount by first determining a likelihood (%) the user will default on the user's current amount of debt. Then, the financial security tool may calculate the debt related portion of the user's monetary risk amount by taking the user's likelihood (%) of defaulting on the user's amount of debt, and multiplying it with the user's annual debt payment amount.

As another example, table 400 illustrates that the financial security tool may ask the user for inputs to calculate what the user's total debt to housing ratio is (e.g., ask what the user's total housing debt is). The user's housing figure corresponds to an amount of mortgage debt (i.e., housing related debt) the user is currently responsible for. Based on the user's response, the financial security tool may determine a housing debt portion of the user's financial security score. For example, the financial security tool may designate a debt to housing threshold such that, if the user's debt to housing ratio is greater than the threshold, the user is determined to be at risk and no points are assigned to the housing debt portion of the user's financial security score. In some embodiments, points may be subtracted to from the user's financial security score if the user's debt to housing ratio is greater than the threshold. For example, the threshold may be 28%.

Conversely, if the user's debt to housing ratio is found to be less than the threshold, the financial security tool may assign points to the housing debt portion of the user's financial security score.

In addition to generating the financial security score as described above, the financial security tool may also calculate a monetary risk amount associated with the user's debt to housing ratio. For example, the financial security tool may calculate a housing debt related portion of the user's monetary risk amount by first determining a likelihood (%) the user will default on the user's current amount of housing related debt. Then, the financial security tool may calculate the housing debt related portion of the user's monetary risk amount by taking the user's likelihood (%) of defaulting on the user's amount of housing related debt, and multiplying it with the user's annual debt payment amount.

In some embodiments, table 400 illustrates that the analysis of the user's monthly budget may additionally reference information describing whether the user is remaining current on his monthly payments. Determining that the user is keeping current on monthly payments may result in the financial security tool assigning more points to the user's financial security score. Conversely, determining that the user is not keeping current on monthly payments may result in the financial security tool assigning less points to the user's financial security score, or even subtracting points from the user's financial security score.

FIG. 5 illustrates a table 500 including questions that may be utilized by the financial security tool in order to inquire a user on topics related to the third core belief illustrated in FIG. 1. Generally, the financial security tool may ask the user whether they have an adequate amount of emergency funds saved up.

More specifically, the financial security tool may ask the user how much the user's has saved up in emergency funds. In some embodiments the financial security tool may assign points to an emergency fund portion of the user's financial security score based on a number of months' worth of emergency funds the user has saved up. For example, the financial security tool may assign a greater number of points to the emergency fund portion of the user's financial security score as the user saves up a greater number of months' worth of emergency funds.

Conversely, the financial security tool may assign a lower number of points to the emergency fund portion of the user's financial security score as the user saves up a lower number of months' worth of emergency funds.

In some embodiments, the financial security tool may only assign point to the emergency fund portion of the user's financial security score if the user has saved up at least a predetermined number of months' worth in emergency funds.

In addition to generating the financial security score as described above, the financial security tool may also calculate a monetary risk amount associated with the user's emergency funds. For example, the financial security tool may calculate an emergency fund portion of the user's monetary risk amount by first determining a number of different classes of emergencies that may occur to the user. For instance, four exemplary classes of emergencies may include: job loss, car insurance deductibles, healthcare deductibles, and home repairs. Each of the exemplary classes of emergencies may potentially require a large sum of money to be paid out of the user's emergency funds. The financial security tool may then calculate a monetary risk amount for each of the classes.

For a job loss emergency, the financial security tool may first determine a level of job security corresponding to the user's current employment position. A weighting percentage may be assigned, in increasing order, for a secure status (e.g., 2%), a somewhat secure status (e.g., 5%), and a not secure status (e.g., 15%). Then the emergency fund portion of the monetary risk amount (MRA) may be calculated as:

$$MRA=(\text{weighting percentage})\times(6 \text{ months of user's income})\times(\text{a fixed weighting percentage})$$

The fixed weighting percentage may be selected by the financial security tool as a representation of the average portion of income that is not covered by unemployment insurance (e.g., 50%).

For a car deductible emergency, the emergency fund portion of the monetary risk amount (MRA) may be calculated as:

$$MRA=(\text{a likelihood of being in a car accident})\times(\text{automobile deductible amount})$$

The information regarding the likelihood of being in a car accident may be obtained from the table 300C-2 illustrated in FIG. 3C. And the automobile deductible amount may be the user's actual deductible amount according to the user's automobile insurance plan. Alternatively, the automobile insurance deductible amount may be an average deductible amount obtained by the financial security tool.

For a health insurance deductible emergency, the emergency fund portion of the monetary risk amount (MRA) may be calculated as:

$$MRA=(\text{a likelihood of being disabled})\times(\text{health insurance deductible amount})$$

The information regarding the likelihood of the user becoming disabled may be obtained from the table 300F illustrated in FIG. 3F. And the health insurance deductible amount may be the user's actual deductible amount according to the user's health insurance plan. Alternatively, the health insurance deductible amount may be an average deductible amount obtained by the financial security tool.

For a home repair emergency, the emergency fund portion of the monetary risk amount (MRA) may be calculated as:

$$MRA=(\text{a likelihood of needing home repairs})\times(\text{average cost of home repair})$$

The information regarding the likelihood of needed home repairs may be obtained by the financial security tool from outside sources (e.g., the likelihood of needed home repairs may be 10%). And the average cost of the home repair may be obtained by the financial security tool from outside sources (e.g., the average cost of the home repair may be 1% of the home value).

The total monetary risk amount related to the user's emergency funds may then be the sum of each calculated MRA for each emergency type determined by the financial security tool.

FIG. 6 illustrates a table 600 including questions that may be utilized by the financial security tool in order to inquire a user on topics related to the fourth core belief illustrated in FIG. 1. Generally, the financial security tool may ask the user what is their retirement plans and goal, and what percentage of their income they are saving for retirement (e.g., how much of your monthly income are you saving for retirement). The financial security tool may then ask how much the user has saved up as part of their retirement plan.

In determining a retirement plan portion of the user's financial security score related to the user's retirement plan, the financial security tool may first reference the user's retirement plan. The user's retirement plan will include information outlining certain milestones the user established for the user's retirement plan. The milestones may identify an amount of retirement money the user planned on saving by certain age milestones. Then, by taking the amount of retirement money the user has currently saved up, and comparing it against the amount of retirement money the user planned on saving by this age according to the milestones identified in the use's retirement plan, the financial security tool may calculate a percentage of the retirement goal the user has currently achieved. The higher the percentage of achievement, indicates the more the user is currently on track with the user's planned retirement goals and milestones. Consequently, the higher the percentage of achievement, the greater number of points the financial security tool will assign to the retirement plan portion of the user's financial security score.

In addition, in some embodiments the financial security tool may weight the retirement plan portion of the user's financial security score based on the user's retirement goals such that the financial security score is weighted lower for a younger user, and weighted higher for an older user. In this way, the financial security tool will apply greater emphasis on the achievement of the user's retirement goals as the user becomes older.

FIG. 7 illustrates a table 700 including questions that may be utilized by the financial security tool in order to inquire a user on topics related to the fifth core belief illustrated in FIG. 1. Generally, the financial security tool may ask whether the user's will is prepared. The financial security tool may also ask whether other important legal documents have been prepared.

The financial security tool may calculate the legal document portion of the user's financial security score by assigning a set number of points for each important legal document the user is found to have properly prepared. If the user has none of the legal documents identified by the financial security tool as being important prepared, the financial security tool will assign no points to the legal document portion of the user's financial security score.

The financial security tool may calculate a monetary risk associated with having the appropriate legal documents in place. The calculation may take into account the user's total net worth and likelihood of mortality along with the number of dependent children. The financial security tool may begin by multiplying the total net worth with the likelihood of mortality to arrive at a preliminary value for the calculated monetary risk. This value may also be adjusted to account for final arrangements. For example, the value may be reduced by a fixed value of $15,000, which is seen as approximating the cost of final arrangements. The value is further adjusted to account for the potential impact that the lack of having a will in place may have. For example, the figure may be multiplied by a fixed percentage (20%). This value is further adjusted to account for guardians, which looks at the likelihood of mortality and the number of dependent children. For example, the value may be increased based on the likelihood of mortality is multiplied by a fixed number of $25,000 per child.

FIG. 8 illustrates a table 800 including questions that may be utilized by the financial security tool in order to inquire a user on topics related to the fifth core belief illustrated in FIG. 1. Generally, the financial security tool may ask the amount of the user's net worth.

The financial security tool may calculate the net worth portion of the user's financial security score by assigning a set number of points for the user's net worth being above certain thresholds. The tool may calculate based on what is already known about the user. For example, the user's net worth may need to be above a floor threshold (e.g., $100,000) in order to be assigned a non-zero number of points. This is because high net worth individuals who manage their finances responsibly are able to self insure and absorb major financial losses should be rewarded with points indicating a higher level of financial security. Then, the financial security tool may assign additional points for each subsequent threshold the user's net worth is found to be beyond the floor threshold. If the user's net worth is below the floor threshold, the financial security tool may assign zero points to the user's financial security score. In some cases, if the user's net worth is below a certain minimum threshold, the financial security tool may subtract points from the user's financial security score.

Figure 9:
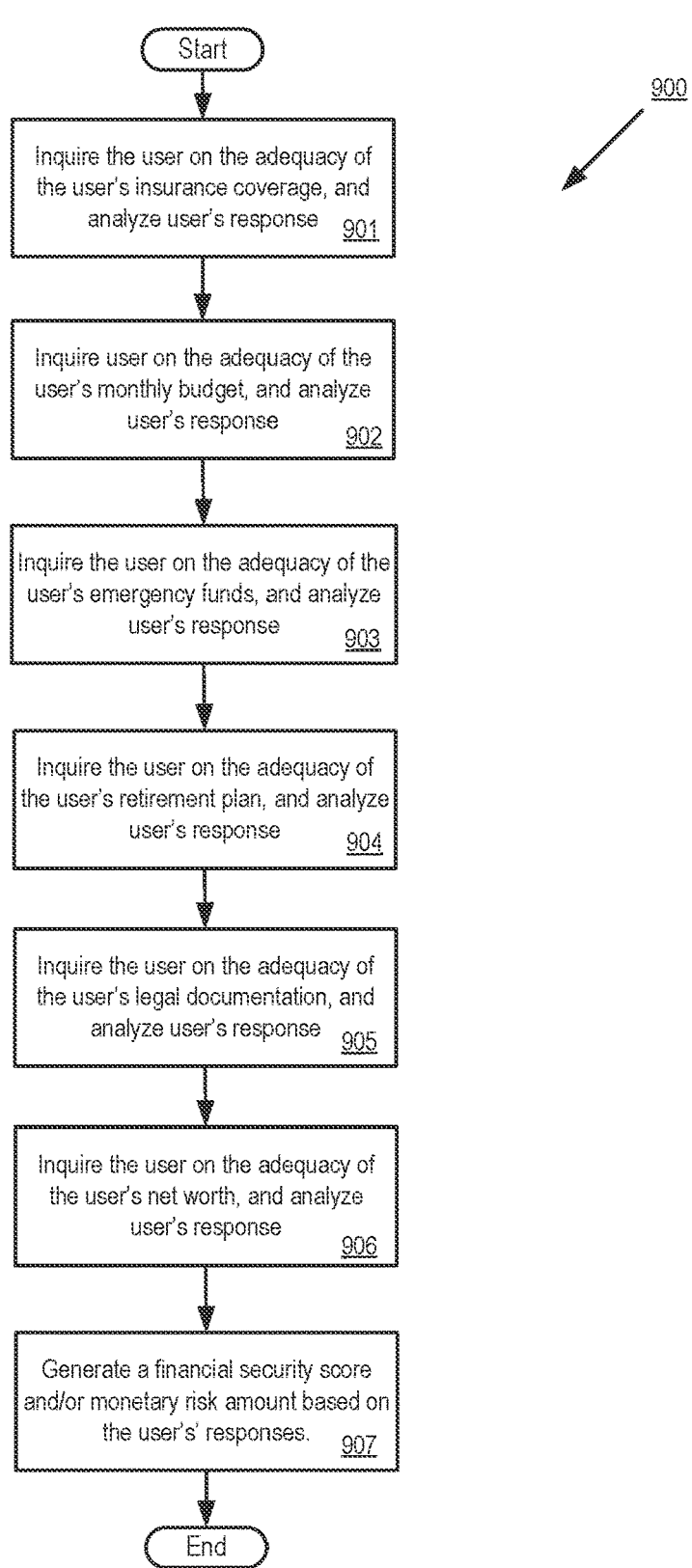
FIG. 9 illustrates an exemplary flow chart describing a process for presenting a user with a financial security indicator, according to the present invention.
Figure 9B:
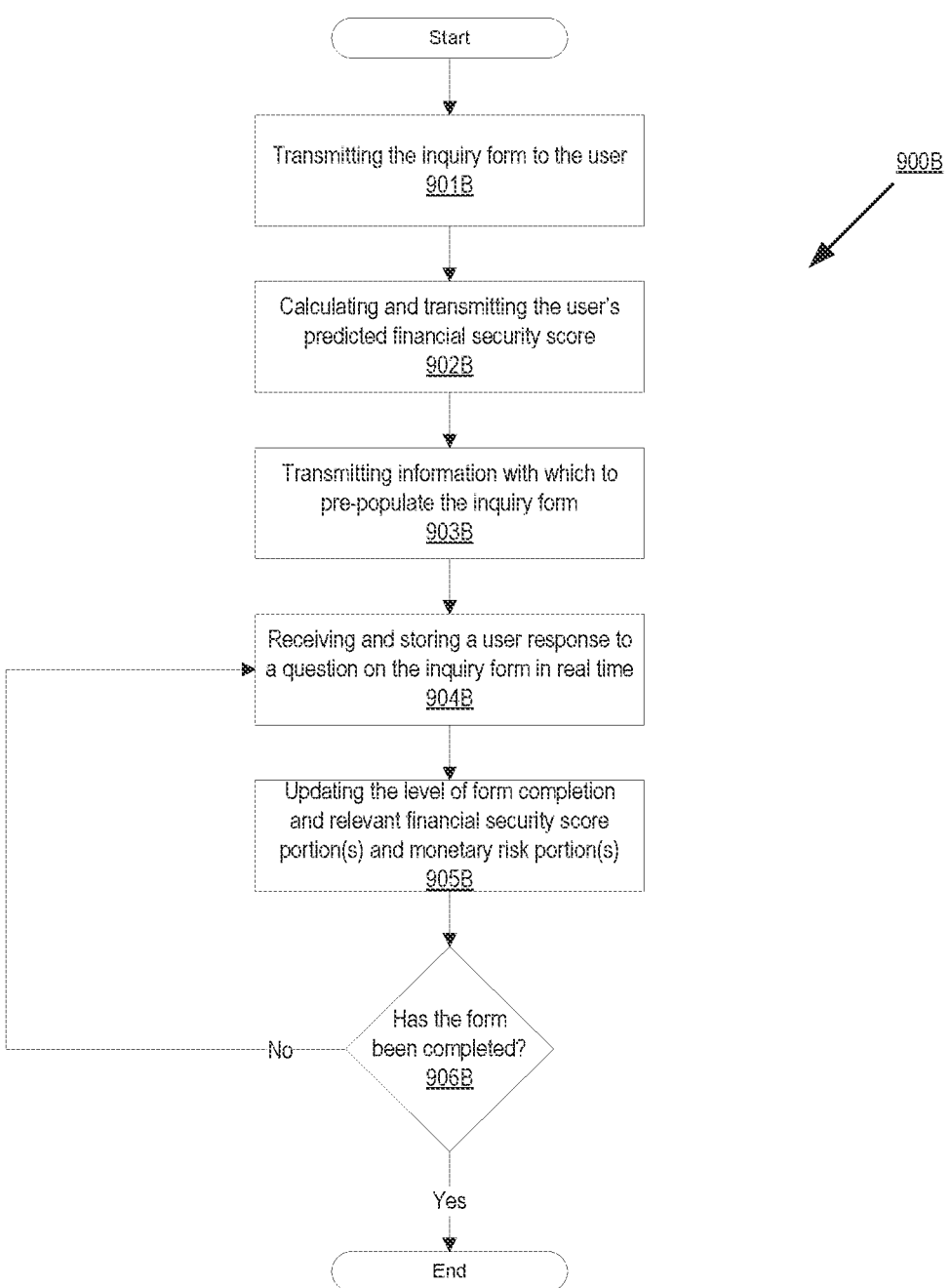
FIG. 9B illustrates an exemplary flow chart describing a process for questioning the user on issues relating to the financial institutions core beliefs.

FIG. 9 illustrates a flow chart 900 describing a process implemented by the financial security tool for generating a user's financial security score and/or the user's monetary risk amount.

At 901, the financial security tool may inquire the user on the adequacy of the user's insurance coverage. The inquiries may correspond to the inquires described above related to the types of insurance described above with reference to table 300A in FIG. 3A. After receiving the user's response, the financial security tool may analyze the response in order to generate corresponding portions of financial security scores and/or monetary risk amounts as described above regarding the user's insurance coverage.

At 902, the financial security tool may inquire the user on the adequacy of the user's monthly budget. The inquiries made by the financial security tool may correspond to the inquiries described above with reference to table 400 in FIG. 4. After receiving the user's response, the financial security tool may analyze the response in order to generate corresponding portions of financial security scores and/or monetary risk amounts as described above in relation to the user's monthly budget.

At 903, the financial security tool may inquire the user on the adequacy of the user's emergency funds. The inquiries made by the financial security tool may correspond to the inquiries described above with reference to table 500 in FIG. 5. After receiving the user's response, the financial security tool may analyze the response in order to generate corresponding portions of financial security scores and/or monetary risk amounts as described above in relation to the user's emergency funds.

At 904, the financial security tool may inquire the user on the adequacy of the user's retirement plan. The inquiries made by the financial security tool may correspond to the inquiries described above with reference to table 600 in FIG. 6. After receiving the user's response, the financial security tool may analyze the response in order to generate corresponding portions of financial security scores and/or monetary risk amounts as described above in relation to the user's retirement plan.

At 905, the financial security tool may inquire the user on the adequacy of the user's legal documentation. The inquiries made by the financial security tool may correspond to the inquiries described above with reference to table 700 in FIG. 7. After receiving the user's response, the financial security tool may analyze the response in order to generate corresponding portions of financial security scores and/or monetary risk amounts as described above in relation to the user's legal documentation.

At 906, the financial security tool may inquire the user on the adequacy of the user's net accumulation (i.e., net worth/wealth). The inquiries made by the financial security tool may correspond to the inquiries described above with reference to table 800 in FIG. 8. After receiving the user's response, the financial security tool may analyze the response in order to generate corresponding portions of financial security scores and/or monetary risk amounts as described above in relation to the user's wealth accumulation.

At 907, the financial security tool may generate the user's overall financial security score by summing each individual financial security score portion obtained throughout 901-906 above. In addition, the financial security tool may generate the user's overall monetary risk amount by summing each individual monetary risk amount portion obtained throughout 901-906 above.

Although flow chart 900 describes the financial security tool inquiring about the user's adequacy of insurance coverage, monthly budget, emergency funds, retirement plan, legal documentation, and net worth, not all of these attributes need to be taken into account when generating the user's overall financial security score and/or monetary risk amount. In this way, the financial security tool may generate the user's overall financial security score and/or monetary risk amount according to any combination of one or more of the attributes described in flow chart 900. In addition, other attributes not specifically described in flow chart 900, but that are related to the user's financial security, may be taken into consideration when generating the user's overall financial security score and/or monetary risk amount.

It is noted that in generating the financial security score, it may be necessary for the financial security tool to calculate various financial security score portions and/or monetary risk amount portions. As described earlier, the calculations involved for each score portion or monetary risk amount portion may draw upon a wide range of data sources including, for example and without limitation, actuarial tables like those illustrated in FIGS. 3B-F, user responses to survey questions, or information regarding financial products and services held by the user. Further, the financial security tool may leverage various data sources to define the calculation rules themselves. For example, the financial security tool may interface with a retirement planning provider (i.e., a third party institution server 240) to determine the requisite level of retirement savings needed by a user, which the financial security tool may then use in determining how points should be assigned for the relevant financial security score portions and/or calculated monetary risk amount portions.

Further, as illustrated in FIG. 2, the financial institution server 220 may be able to access some of the data sources locally from the local database repository 224 or may interface with private third party institution servers or public data servers 240 to access external database repositories 244 over the communication network(s) 210. Where the data is not stored locally, the financial institution server 220 may choose to update the information in different manners. For example, the data source may be queried by the financial institution server 220 in real-time to determine the information. Additionally or alternatively, the financial institution server 220 may periodically contact the data source to determine the relevant information, and when relevant locally store the information. This may also provide a source of redundancy in case the third party or public server is unavailable.

In addition to calculating the user's overall financial security score and overall monetary risk amount, the financial security tool may provide the user with feedback regarding their financial security score, in the form of a financial security score card. An exemplary financial security score card is illustrated in FIGS. 11A-D and is described in further detail below. FIG. 10 illustrates a number of tables including information that may be utilized by the financial security tool when generating the user's overall financial security score and/or monetary risk amount and which may be used in generating the financial security score card.

For example, table 1001 includes information describing attributes of the user such as the user's age, gender, marital status, number of dependents, credit score and state of residence. The information provided in table 1001 may have been entered by the user at a previous time. For instance, the user may have provided such information when signing up to be a member on the financial institution's website. The information provided in table 1001 may then be referenced by the financial security tool when generating the user's financial security score and/or monetary risk amount.

FIG. 10 also illustrates table 1002, where table 1002 includes the user's responses to a series of inquiries from a survey presented to the user by the financial security tool. For the user's convenience, any components of table 1002 that may have been entered by the user at a previous time, will be prepopulated by the financial security tool. Additionally or alternatively, certain fields may be prepopulated based on known information regarding relevant products or services held with the financial institution and/or other third parties. The information provided in table 1002 may be referenced by the financial security tool when generating the user's financial security score and/or monetary risk amount.

FIG. 10 also illustrates table 1003-A, where table 1003-A includes the user's responses to the series of inquiries presented to the user by the financial security tool related to the financial institution's core beliefs, as described above. This information provides the basis for the financial security tool's ability to generate the user's financial security score and/or monetary risk amount. Table 1003-A is illustrated as including information regarding the user's adequacy in the following financial security categories: health insurance, disability insurance, automobile insurance, property and umbrella insurance, life insurance, long term care insurance, legal documents (e.g., wills and guardianship documents), emergency funds, debts, and human capital/net wealth. For each category, the financial security tool is able to generate a corresponding financial security score portion and a monetary risk amount portion. For example, for the health insurance category, the financial security tool calculates that based on the user's current health insurance coverage, the user's monetary risk amount is $1,384. Also under the health insurance category, the financial security tool calculates that based on the user's current health insurance coverage, the user's financial security score portion is 12 points out of a maximum possible score of 15 points. The table 1003-A goes on to provide exemplary monetary risk amounts and financial security scores for each of the illustrated categories.

Table 1003-B describes the user's overall financial security score (57/100) as calculated by the financial security tool based on the user's financial security performance in the categories included in table 1003-A. The financial security tool calculates the user's overall financial security score by summing each individual financial security score portion. This is further illustrated by the table 1004 that displays the user's overall financial security score.

Table 1003-B also describes the user's overall monetary risk amount ($6,857) as calculated by the financial security tool based on the user's financial security performance in the categories included in table 1003-A. The financial security tool calculates the user's overall monetary risk amount by summing each individual monetary risk amount portion.

It should be noted that the financial security tool may assign the maximum possible number of points for each category to add up to 100, as illustrated by table 1003-A and 1003-B.

Referring back to FIG. 11, the financial security score card 1100A, 1100B may also provide the user with a breakdown 1102A, 1102B of their financial security score 1101A, 1101B, providing an explanation 1105A, 1105B of what the score means and how the score was calculated. The breakdown may also discuss a particular associated core belief or other categorical grouping 1103A, 1103B along with the corresponding financial security score portions 1104A, 1104B. The provided explanation 1105A, 1105B may also describe the components and methodology used to calculate the financial security score and score portions, and may present the actual calculations used. The presentation of such information may be automatic or based upon a user request for additional information. The financial security score card may assume both a collapsed 1100C and an expanded form 1100A, presenting additional information, which the user may selectively toggle between 1107A, 1107C. One goal of presenting such an explanation is to inform and empower the user to take action regarding their financial security.

As part of the breakdown, the user may be presented with a qualitative explanation of the user's overall financial security score 1106A, 1106B and/or core beliefs and categorical groupings 1105A, 1105B. For example, the financial security score card may provide the user with the score achieved for the protection and insurance category 1104A, 1104B along with a description of the user's progress with respect to that category and an explanation of what a strong score in the categories signifies 1105A, 1105B. The breakdown may additionally or alternatively present the user with tips on how frequently to monitor a particular category, what to do to maintain a score in a particular category, or why improvement in a category would be helpful to the user.

The financial security score card may also provide one or more suggestions for the user to improve their financial security score. The financial security tool may generate the suggestions for the user to improve their financial security score based on the user's responses to the inquiries as described above. In doing so, the financial security tool may assess the impact that a particular action will have on a particular financial security score portion as well as the user's overall financial security. The financial security tool may also assess the compound effect that multiple actions may have on the user's financial security score.

By way of example, FIG. 10 illustrates table 1005 that includes the top three suggested ways for the user to improve their financial security score, as generated by the financial security tool. This includes buying life insurance, putting more money into their emergency funds, and preparing a financial plan. It should be noted that a greater or lesser number of suggestions may be displayed on the financial security score card, and that the user may also be presented with the ability to view all relevant suggestions.

Figure 11A:
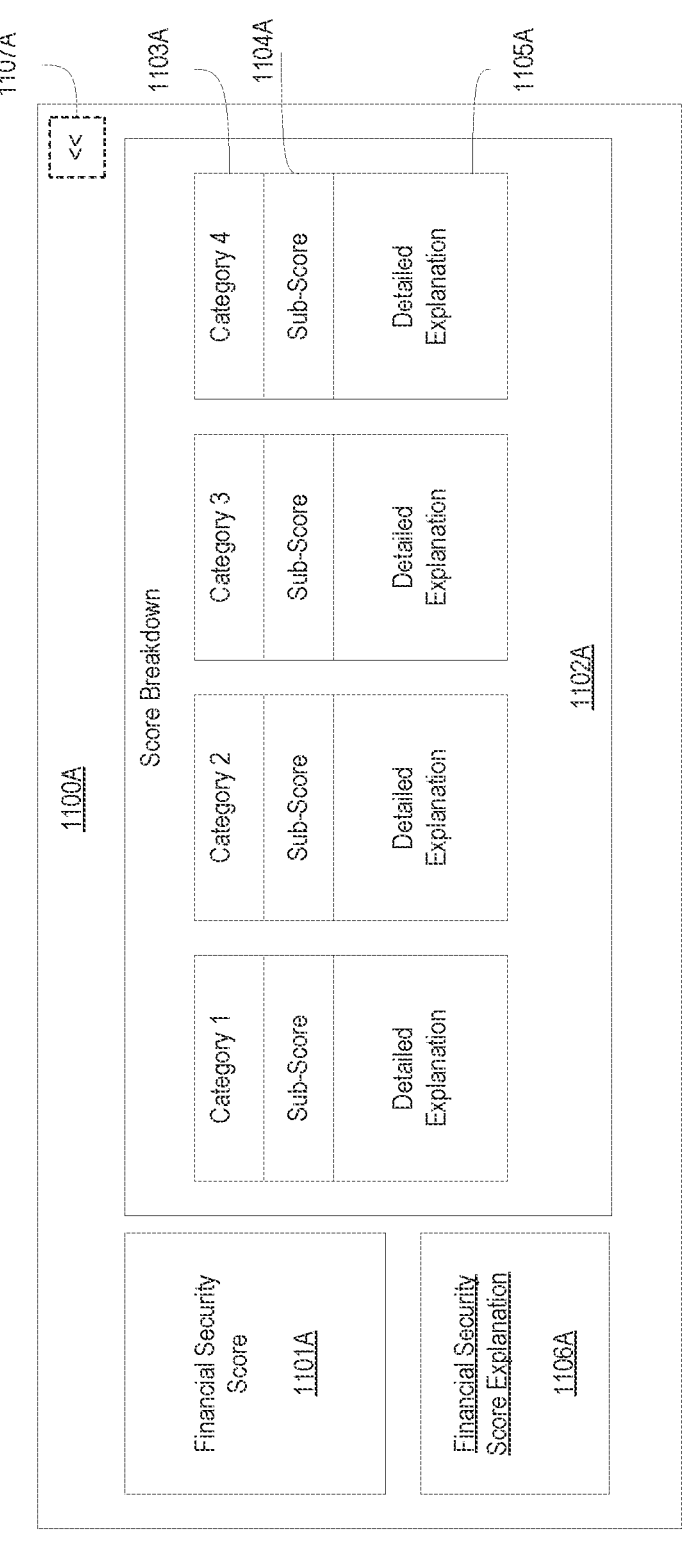
FIG. 11A illustrates an exemplary expanded financial security score card that may be presented to the user.
Figure 11C:
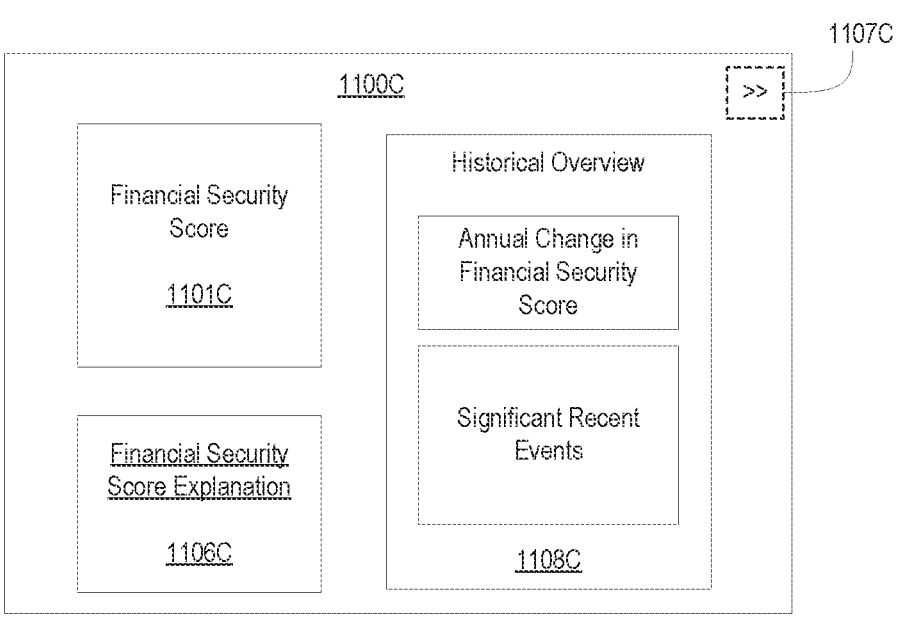
FIG. 11C illustrates an exemplary collapsed financial security score card to be presented to the user.
Figure 11D:
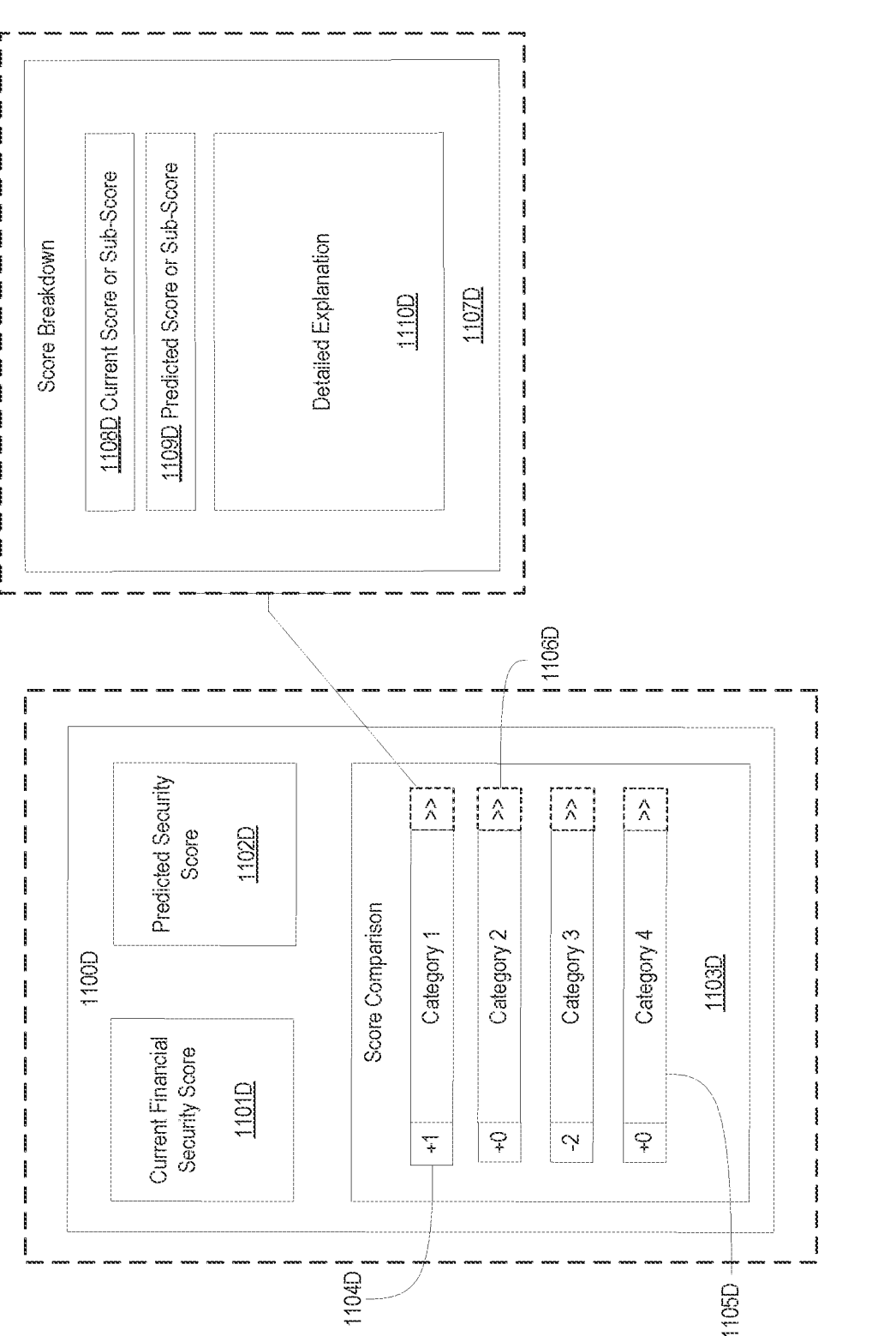
FIG. 11D illustrates an exemplary financial security score card where a detailed explanation of a suggested action is provided.

Referring to FIG. 11D, the financial security score card may also provide the user with a detailed explanation 1110D of why taking such action would be significant. As part of the explanation, the user may be presented with the quantitative or qualitative effect that the action may have on the user's overall financial security score. For example, the financial security tool may generate a comparison of the financial security score before and after an action is taken 1101D, 1102D to be included in the financial security score card. The user may also be presented with a breakdown of those financial security score portions that would be affected by the particular course of action. For example, the financial security score card may present the change 1104D in each affected financial security score portion, where the affected financial security score portions may also be identified in the aggregate based on an associated core belief or some other categorical grouping 1105D. The provided explanation may also describe the components and methodology used to calculate the financial security score and score portions, and may present the actual calculations used. For example, the financial security score card may present a comparison between the calculated monetary risks of the financial security score portions before and after a particular action is taken along with the components considered and values used in calculating each monetary risk portion. While the explanation described here is made with reference to the financial security scored card, similar explanations may be provided by the financial security tool in various context as described in further detail below. Generally, the above described qualitative and quantitative explanation, including the relative change in the user's financial security score, may be provided automatically to help the user in making decisions. Such information may always be visible to the user, or it may only appear under certain desired contexts. As described below, the financial security score may automatically be updated. In this way, the user may automatically be presented with up to the date information and guidance regarding the user's financial security score.

The financial security tool may also suggest specific financial products that may be offered to the user, including those offered by the financial institution itself and those offered by third party institutions, where purchasing the presented financial products will result in an improvement in the user's financial security score. As the user completes the suggested tasks, or buys the suggested products, the user's financial security score may be recalculated by the financial security tool, and a new set of suggestions may be generated based on updated user information. In the case of third party product offerings, the financial security tool may interface directly with the third party institution, or prompt the user for specific information. In the case of third party products and services, the information may be gathered automatically or upon user intervention. Where the information is to be entered manually, the financial security tool may query the user to enter values for parameters related to the financial product or service. The financial security tool may also pre-populate these parameters based on typical values for that financial product, which in turn may take into account particular user information including the responses provided in the survey inquiry described above.

Further, the suggestions for improving the user's financial security may be generated as one or more action plans, providing the user with a sequence of steps that the user may take in order to improve particular aspects of their financial security. The action plan may be generated in view of the user's financial security as a whole or with respect to particular aspects or features of the user's financial security.

By way of example, the financial security tool may suggest that a user increase the amount of their emergency fund (e.g., by $2,500) and may generate a contribution plan that the user may follow to save the required amount of funds. The contribution plan may provide a timeline for saving the suggested amount of emergency fund by identifying an amount and frequency at which periodic contributions should be made (e.g., $100 per month). As another example, the financial security tool may suggest that a user improve their health or fitness (e.g., decrease the user's blood pressure, manage the user's blood sugar, etc.), which may improve the health insurance portion of their financial security score, and may generate an exercise or dietary plan for the user to follow.

The steps identified in the action plan may be personalized to the user allowing the user to more easily take action. The financial security tool, for example, may look at the user's current financial state (e.g., by looking at the user's budget, currently available funds, existing obligations, etc.) to see if the user can readily address the suggestion. The financial security tool may identify funds that are not being optimally used (e.g., funds in a brokerage account that are poorly invested), and may suggest an alternative use for these funds (e.g., suggest that the funds be directed towards the user's health insurance). In other cases, the financial security tool may generate an action plan that identifies specific user behavior that may be modified to help address the suggestion. For instance, where periodic contributions are suggested to the user (e.g., to increase the amount of the user's emergency fund), the financial security tool may identify adjustments that the user can make in their spending habits to free up the required funds. The financial security tool, for instance, may determine that the user can make the suggested contributions if they skip their daily coffee purchase or dine out one less time per month. By identifying specific behavior that the user may change, the financial security tool may provide a clearer pathway by which the user may improve their financial security score.

The financial security tool may identify potential behavioral changes in a variety of ways. The financial security tool, for example, may analyze the user's financial history, in particular their transaction and budget history, to identify discretionary spending habits that the user may be able to change. A user's transaction history may provide a list of individual transactions that the user has previously engaged in, where each individual transaction may be characterized by different attributes. For example, a purchase transaction may identify a vendor or service provider, a date and time of the transaction, a location where the transaction took place and an amount of the transaction. The financial security tool may aggregate the user's transactional history by looking at a number of different data sources, for example, combining transaction data from the user's checking accounts, savings accounts, credit card accounts, mobile payment system accounts, or the like. The financial security tool may process the user's transaction and budget history using different analytical models and identify certain repeated transactions that the user engages in. The financial security tool, for example, may observe that the user makes a purchase at a coffee shop each morning between 8 a.m. and 10 a.m., goes out for dinner and a movie every Friday night, or goes on a cruise each winter, and may calculate the amount of money that is spent for each of the transactions. When generating the personalized action plan, the financial security tool may identify a combination of one or more transactions that the user may forego in order to save the necessary funds and may set goals to avoid these transactions.

The financial security tool may also provide the user with specific information and/or tools to help complete these steps, and may interface with other products or services, held with the financial institution or a third party, to automatically monitor the user's progress. For instance, it may be difficult for a user to change their behavior (e.g., their spending behavior) on their own, particularly where the user is not actively aware, or conscious, of their behavior. In such cases, the financial security tool may assist the user in making the suggested behavioral changes. The financial security tool, for instance, may allow the user to monitor certain behaviors, and may provide proactive guidance or advice that may allow the user to more successfully modify their behavior. For example, where a user has decided to skip their daily morning coffee, the financial security tool may monitor the user's location (e.g., based on the GPS location of the user's mobile device), and send a notification message to the user as they enter a coffee shop, reminding the user to try and avoid making a purchase. The financial security tool may continue to monitor the user to determine whether the user engages in the behavior and may take certain actions when the user successfully avoids the behavior. The financial security tool, for example, may continue to monitor the user's location to determine whether the user avoids the store or look at the user's transaction data to see whether a purchase was made at the store, and may send a notification message to the user acknowledging or praising the user for avoiding the behavior (e.g., 'Great job in skipping your coffee purchase, you saved $5.16'). As another example, the financial security tool may automatically transfer funds between user accounts (e.g., from the user's checking account into their emergency fund) in an amount commensurate with the behavior avoided.

The financial security tool may also allow the user to track how successful they are in meeting their goals and making the desired behavioral modifications. The financial security tool, for example, may provide progress updates to the user in the acknowledgment message that is sent to the user when they avoid a particular behavior (e.g., 'You've skipped coffee twice this week and only need to skip coffee one more time to meet your goal'). The financial security tool may also implement a point system, or the like, and may award points to the user at different milestones. The financial security tool, for instance, may award points when the user starts monitoring their behavior or when the user makes progress towards changing the behavior (e.g., successfully avoids engaging in a spending habit). By awarding points for granular achievements (e.g., for each periodic contribution of $100), the financial security tool may better engage the user in making a change, which may be borne out over a long period of time (e.g., increasing the amount of their emergency fund by $2,500). The financial security tool may also dynamically adjust the action plan based on the user's progress towards their goals. For example, if the user is unable to avoid certain behavior, the financial security tool may suggest alternative changes that would help the user stay on track to meet their goal. The user may also be able to manually update their progress with respect to each step, for example, if the user purchased a financial product from a third party which the user had not yet linked to the user's account.

Figure 14:
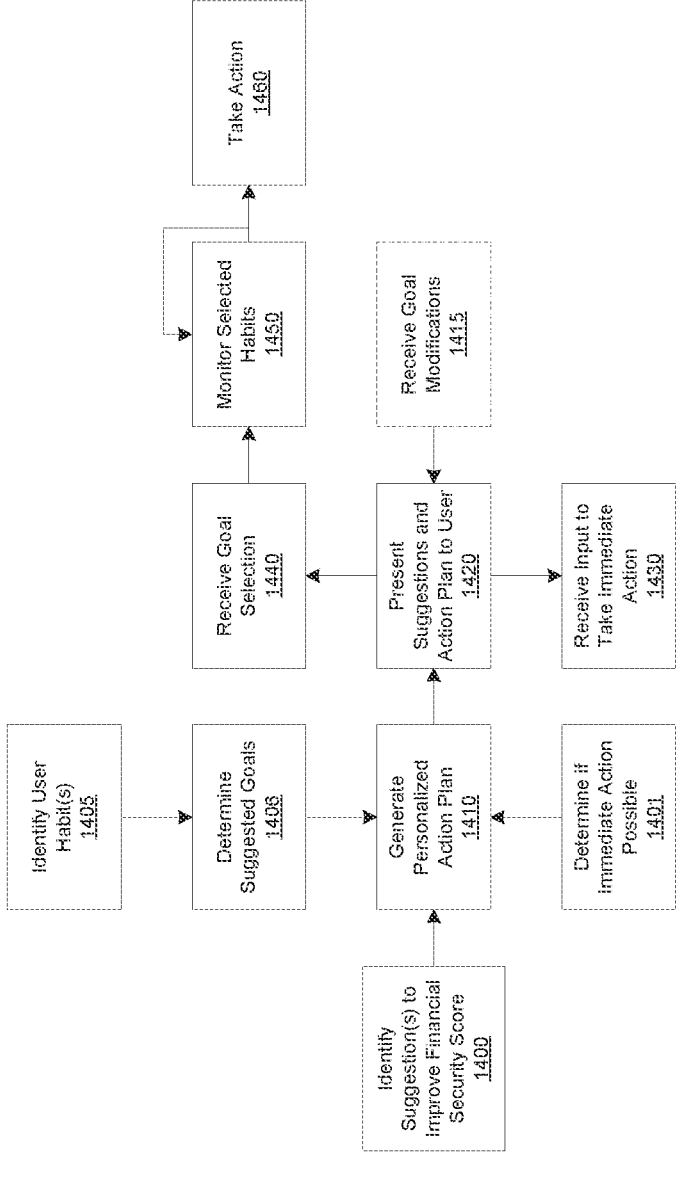
FIG. 14 provides an example of some the logic that the financial security tool may employ in providing guidance to the user.

FIG. 14 provides an example of some the logic that the financial security tool may employ in providing guidance to the user. The financial security tool may identify one or more suggested changes that the user may make to improve an element of their financial security score or their financial security score as a whole 1400. The financial security tool, for example, may suggest that the user increase their auto-insurance coverage, pay down their credit card debt, and increase the amount of their emergency fund. The financial security tool may then generate a personalized action plan that identifies specific steps that the user may take to make the suggested changes 1410.

In generating the action plan, the financial security tool may determine if immediate action is possible 1401. The financial security tool, for example, may assess whether the user is able to address the suggestion given their current financial state. As an example, the financial security tool may determine that the user is able to cover the cost of increased auto-insurance coverage within their existing budget, and suggest that the user purchase the increased insurance coverage. The financial security tool may also suggest that the user could pay down their credit card debt or increase their emergency fund by making periodic contributions in a certain amount, but may determine that the user is unable to make such contributions within their current budget. In such cases, the financial security tool may identify one or more user habits that may be modified to address the suggestion 1405.

A habit may generally be thought of as a particular type of event that is characterized by certain contextual parameters under which the event takes place. In some embodiments, the financial security tool may identify one or more discretionary spending habits of the user. The financial security tool, for example, may identify selective reductions that the user may make to their variable spending in order to free up funds to be used in making the suggested change. A discretionary spending habit may be a purchase transaction having an associated location parameter, temporal parameter, and transaction amount parameter. The location parameter may identify a target location that is a physical location (e.g., GPS coordinates) and/or categorically describes the location (e.g., coffee shop) at which the event takes place. The temporal parameter may capture a particular timeframe (e.g., 8:00 a.m. to 10:00 a.m., morning) and/or a frequency (e.g., daily, weekly, each winter) at which the event takes place. The transaction amount parameter may indicate a typical monetary amount, or a distribution of monetary amounts, associated with the transaction.

As noted above, the financial security tool, in generating an action plan for the user, may determine suggested goals for the user to meet in changing particular habits 1406. The financial security tool, for example, may determine that the user could make periodic contributions (e.g., $100.00 per month) to increase their emergency fund or pay down their credit card debt by purchasing coffee two fewer times per week saving $10.00 per week (or $40.00 per month) and dining out two less times a month saving $60.00 per month, or spending half as much at the mall on each visit saving at least $100.00 per month.

The financial security tool may present the suggestions and corresponding action plans to the user and help the user take action 1420. If possible, the financial security tool may allow the user to take immediate action to address the suggested changes 1430. For example, where increased health insurance coverage is suggested and the user has funds available in their checking or savings account, the financial security tool may allow the user to purchase additional health insurance coverage. In cases where the financial security tool has suggested changes to specific user habits (e.g., user spending habits), the financial security tool may allow the user to select which habits, if any, that the user would like to try and change, and select suggested goals for the user to try and follow 1440. In some embodiments, the financial security tool may allow the user to modify the action plan to include different goals that the user may be more comfortable with following 1415. The user, for example, may create a modified action plan where the user chooses to purchase coffee one less time per week saving $5 per week (or $20 per month), dine out one less time a month saving $30.00 per month, and spend half as much at the mall on one visit saving at least $50.00 per month.

The financial security tool may also allow the user to monitor the selected habits and provide proactive advice to the user to help meet the action plan goals 1450. For example, the user may choose to monitor their discretionary spending habits, and may receive notification messages from the financial security tool that help the user meet their goals. The financial security tool may automatically take action when the user is able to avoid the behavior in question 1460. For example, when the user is successfully able to avoid engaging in a discretionary spending habit, the financial security tool may automatically transfer funds between user accounts, where the amount parameter associated with the discretionary spending habit indicates the amount of funds that is to be transferred.

Figure 15:
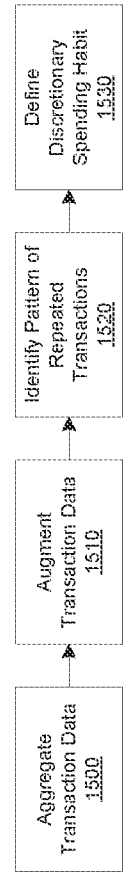
FIG. 15 provides an example of the logic that the financial security tool may employ in identifying a discretionary spending habit of a user.

FIG. 15 provides an example of the logic that the financial security tool may employ in identifying a discretionary spending habit of a user. The financial security tool may begin by aggregating transactional data from different user accounts (e.g., savings and checking accounts, credit card accounts, mobile payment accounts, etc.) 1500. The financial security tool may enhance the aggregated transactional data with additional information that may more fully describe the context in which the event took place 1510. The financial security tool, for example, may determine the season during which the transaction occurred or determine the GPS coordinates of and/or assign a categorical description to the location where the transaction took place. The financial security tool may access transaction data and/or enhance the transaction data using information stored in the local database repositories 224 of the financial institutions server 220 or from external database repositories 244 of private third party institution servers or public data servers 240. The financial security tool may model the aggregated transactional data (or augmented transactional data) and perform data analytics to identify a pattern of repeated transactions 1520, and may use the identified transactions to define a user spending habit 1530. The financial security tool, for example, may observe that a user makes a $5.00 purchase at a coffee shop each morning, goes out to dinner each weekend costing $30.00 on average, or goes shopping at a mall near work every other week (e.g., when they receive their paycheck) spending at least a $100.00 on each visit.

Figure 16:
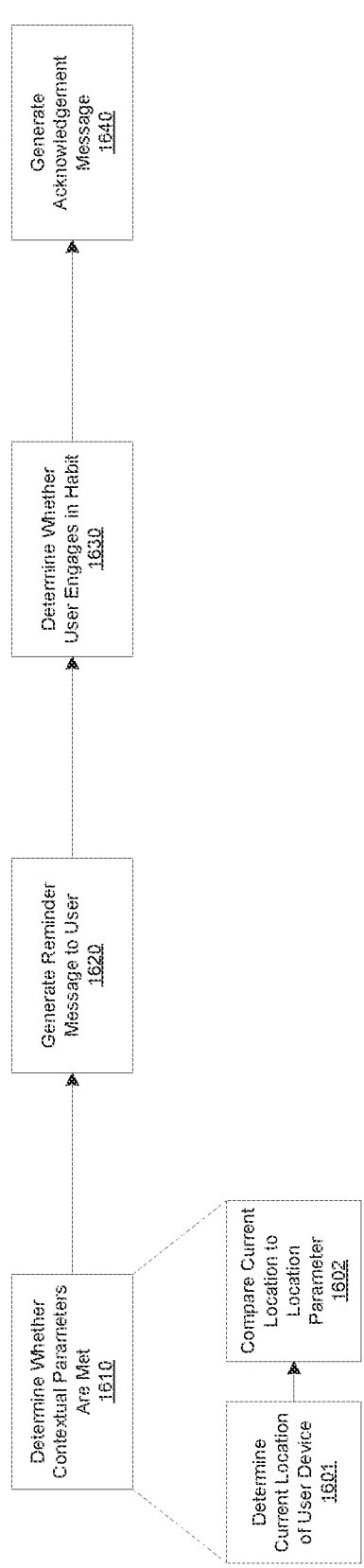
FIG. 16 provides an example of the logic that the financial security tool may employ in monitoring a discretionary spending habit of a user.

FIG. 16 provides an example of the logic that the financial security tool may employ in monitoring a discretionary spending habit of a user and providing proactive advice to the user to help meet their action plan goals. In monitoring the discretionary spending habit of the user, the financial security tool may first determine whether certain contextual parameters have been met, which may indicate that the user is about to engage in the discretionary spending habit 1610. The financial security tool, for example, may determine whether the temporal parameter for the discretionary spending habit has been met and/or whether the location parameter for the discretionary spending habit has been met. In doing so, the financial security tool may determine the current time or current geolocation of the user communication device 230, and may compare the current time to the temporal parameter of the discretionary spending habit to see if the temporal parameter is met or compare the determined geolocation to the location parameter of the discretionary spending habit to see if the location parameter is met. By way of example, where the temporal parameter specifies a particular time of the day (e.g., 8:00-10:00 am or the evening), the financial security tool may determine whether the current time falls within the specified time of the day. Where the location parameter of the discretionary spending habit is a particular physical location (i.e., location coordinates), the financial security tool may look to see whether the user is within a certain distance (e.g., 100 feet) of the specified location. And where the location parameter provides a categorical description of a location (e.g., coffee shops), the financial security tool may look to see whether there are buildings or stores within a certain distance (e.g., 50 feet) of the user that fit the categorical description.

The location of the user communication device 230 may be determined in a variety of ways. The user communication device 230, for example, may be able to determine its location using different location determination circuitry and may provide this location information to the financial security tool. For instance, the user communication device 230 may utilize its GPS communication interface to communicate with GPS satellites and calculate the geographic location of the user communication device 230 based on information received from the GPS satellites. The location of the user communication device 230 may also be determined using network based techniques, which rely on the network infrastructure to which the user communication device 230 is connected to determine its location. For example, where the user communication device 230 is connected to a cellular network, cell identification, triangulation or Forward Link timing methods may be used to determine the physical location of the user communication device 230. In some embodiments, the user communication device 230 may implement these methods, while in other embodiments the cellular service provider may be able to implement these techniques, which may allow for passive monitoring of the location of the user communication device 230. The location of the user communication device 230 may also be determined based on the Wi-Fi network(s) that the user is connected to, or within range of, and may rely on crowd-sourced Wi-Fi data in doing so. Hybrid approaches may combine different location identification techniques to determine a location of the user communication device 230 more quickly, accurately and/or precisely. Assisted GPS (A-GPS), for example, may utilize information provided by the cellular network to augment the GPS calculation process mentioned above.

The financial security tool may evaluate whether the contextual parameters have been met periodically (i.e., at specific intervals) or in a continuous manner, and may evaluate the contextual parameters collectively (i.e., at the same time) or discretely (i.e., on an individual basis). The financial security tool, for example, may continuously evaluate whether the temporal parameter is satisfied, but may periodically evaluate whether the location parameter is satisfied. Assessing whether a particular contextual parameter is met may also be conditional on whether other contextual parameters have been satisfied. For example, the location parameter for a discretionary habit may only be evaluated when the temporal parameter has already been satisfied.

The manner in which the different contextual parameters are evaluated may also vary depending on how the financial security tool is implemented (i.e., executed on the financial institutions server 220, user communication device 230, or partitioned between the two). For example, where the financial security tool is implemented on the user communication device 230, the financial security device, in determining the location of the user, may activate the GPS communication interface on the user communication device 230 to initiate communication with various GPS satellites and calculate the geographic location of the user communication device 230 based on information received from the GPS satellites in response. As another example, where the financial security tool is partitioned between the financial institution server 220 and user communication device 230, the financial security tool operating on the financial institution server 220 may attempt to determine the location of the user. In doing so, a location request may be sent to the user communication device 230, which the financial security tool operating on the user communication device 230 may receive and process, for example, by activating the GPS communication interface and calculating the location of the user communication device 230. Once the location has been calculated, the financial security tool operating on the user communication device 230 may return the current location of the user communication device back to the financial institution server 220. As another example, the financial security tool operating on the financial institution server 220 may additionally, or alternatively, transmit a location request to the cellular service provider, which may be passively tracking the location of the user communication device 230 using network based techniques. The cellular service provider, in response, may return the current location of the user communication device 230 to the financial institution server 220.

The manner in which the different contextual parameters are evaluated may also be optimized in such a way to minimize the resources that are used. By way of example, the financial security tool may periodically update the location of the user. In some implementations (e.g., where the financial security tool is partitioned between the financial institution server 220 and user communication device 230), the financial security tool may repeatedly transmit location requests to the user communication device 230 or cellular service provider at a specified interval, which may respond to each location request as it is received thereby updating the location of the user periodically. In other implementations, where bandwidth or communication overhead is a concern, the financial security tool may be able to send a single location request to the user communication device 230 or cellular service provider, which may include a periodic update parameter, indicating an interval and duration over which updated location information is desired. In response to the single request, the user communication device 230 or cellular service provider may provide periodic updates at the interval and for the duration specified in the request. As another example, where the user communication device 230 is responsible for determining the location of the user (i.e., by activating the GPS communication interface), the financial security tool may choose to update the location of the user at a relatively low frequency in order to minimize the power demand on the user communication device 230. But when the cellular service provider provides the location of the user (i.e., through passive monitoring techniques), the financial security tool may update the user's location more frequently as the power demand on the user communication device 230 is less of an issue.

When the contextual parameters for a discretionary spending habit are met, the financial security tool may generate a reminder message, for example, reminding the user that they are attempting to change the discretionary spending habit and encouraging the user to avoid the behavior 1620. The financial security tool may also continue to monitor the user to determine whether the user engages in the discretionary spending behavior or whether they are able to successfully avoid the behavior 1630. In doing so, the financials security tool may analyze current user transaction data from different user accounts, which may be aggregated in real time, to determine if the particular event type associated with the discretionary spending habit took place. For example, the financial security tool may analyze the user's transaction data to see if a purchase event took place. The financial security tool may also look to see whether the monetary amount of the purchase event was similar to the transaction amount parameter of the discretionary spending habit. The financial security tool, for example, may determine that the monetary amount of the purchase is within a specified percentage of the transaction amount parameter (e.g., within ±10 percent), or falls within the distribution of monetary amounts, associated with the discretionary spending habit. In addition, the financial security tool may continue to evaluate the contextual parameters for the discretionary spending habit to determine if and when they are no longer met. For example, the financial security tool may continue to monitor the user's location and compare against the location parameter for the discretionary spending habit. If the location parameter is no longer satisfied and no purchase event has taken place the financial security tool may determine that the user has successfully avoided the behavior.

The financial security tool may generate an acknowledgement message based on whether the user was successfully able to avoid the behavior 1640. As noted above, the acknowledgment message may identify the discretionary spending habit that was successfully avoided along with the monetary amount that was saved. The financial security tool may also transfer the monetary amount that was saved between different user accounts. The financial security tool may do so automatically using an account relationship previously defined by the user, or it may prompt the user regarding whether they would like to transfer the saved funds and allow the user to identify an account into which they are to be transferred.

The acknowledgement message may also indicate the overall progress that the user has made in modifying their behavior. The financial security tool, for example, may track the user's progress in achieving the goals established in their action plan. In order to do so, the financial security tool may define a progress parameter for each discretionary spending habit in the action plan, which may be updated each time the behavior is successfully avoided. The progress parameter may define the number of times that a particular behavior needs to be avoided within a particular time frame (e.g., purchase coffee three fewer times per week, dine out one fewer time per month, etc.).

The acknowledgment message may also indicate whether the user is on track to achieve their target goals. The progress parameter, for example, may also define the number of times the discretionary spending habit is expected to occur, which may be updated when the discretionary spending habit is encountered (i.e., regardless of whether it was successfully avoided). The financial security tool may compare the number of times remaining for a discretionary spending habit to be avoided to the number of times remaining for it to be encountered to determine if the user is on track. By way of example, the financial security tool may make a determination that the user is not on track when the number of expected occurrences exceeds the number of times that the user needs to avoid the behavior to achieve their goal. If the user is on track to meet their goal, the acknowledgment message may be congratulatory in nature. Alternatively, if the financial security tool determines that the user is no longer on track to meet their goal, it may provide a reassuring message and/or a new action plan that the user may be able to follow (e.g., "Even though you weren't able to reduce your coffee purchases this week, you can still meet your goal by dining out one less time this month").

As noted above, the financial security tool may be partitioned such that part of the financial security tool is being executed on the communication device 230, while another part of the financial security tool is being executed on the financial institution server 220. The following description provides specific examples of the logic that the financial security tool may employ on a financial institution server 220 and communication device 230, respectively, in an embodiment where execution of the financial security tool is partitioned between the financial institution server 220 and communication device 230.

The financial security tool operating on the financial institution server 220 may first analyze a historical dataset of a user to identify recurring events, which it may model as an event type and a set of contextual parameters. The contextual parameters may include a location parameter, identifying a physical location or categorically describing a location. The financial institution server 220 may determine one or more suggested modifications for modifying the recurring events to improve the financial security score of a user. The suggested modifications may vary in terms of which recurring events will be modified and how they will be modified. The financial security tool operating on the financial institution server 220 may then transmit the suggested modifications to the user communication device 230 for presentation to the user.

The financial security tool operating on the user communication device 230 may receive the suggested modifications and present them to the user via a display interface of the user communication device 230 (e.g., the display 238a of the mobile smartphone 230a or the display 238b of the smart watch 230b). Through the user communication device 230, the user may be able to select one or more suggested modifications to monitor. The financial security tool operating on the user communication device 230 may transmit a user monitoring request to the financial institution server 220, requesting monitoring of user progress in achieving the selected suggested modifications. In some embodiments, the financial security tool operating on the financial institution server 220 may transmit alternative modification options along with the suggested modifications, which may indicate which recurring events in a suggested modification may be modified and how they may be modified. The financial security tool on the user communication device 230 may present these alternative modification options to the user who, through the user communication device 230, may be able to adjust the suggested modifications. In instances where the user makes adjustments to a suggested modification, the monitoring request sent to the financial institution server 220 may request monitoring of the adjusted suggested modification and may include information regarding the adjustments that were made.

The financial security tool operating on the financial institution server 220, in response to receiving the user monitoring request, may initiate monitoring of the suggested modifications identified within the request. In monitoring the suggested modifications, the financial security tool on the financial institution server 220 may take certain actions for each recurring event within the suggested modification.

The financial security tool, for instance, may track the location of the user by transmitting user location requests to the user communication device 230 in a periodic or continuous fashion. In some embodiments, the user location requests may be sent to a service provider associated with the communication device 230, which may be passively monitoring the location of the user communication device 230. The financial security tool on the financial institution server 220 may receive location information of the user communication device 230 in response to the user location requests, and may update the location of the user accordingly. The financial security tool may compare the location information to the location parameter of the recurring event to determine whether the user communication device 230 is within a certain range of the physical or categorical location identified by the location parameter. Based on an initial determination that the user communication device is within the specified range of the location parameter, the financial security tool may generate a reminder message reminding the user of the suggested modification to the recurring event and may transmit the reminder message to the user communication device 230.

In some embodiments, the contextual parameters for a recurring event may also include a temporal parameter that captures a particular timeframe and/or frequency during which, or at which, the recurring event may take place. In such instances, the financial security tool operating on the institution server 220, based on the temporal parameter, may determine when the recurring event is expected to occur and may transmit user location requests for a specified time interval before and after the expected occurrence. The financial security tool operating on the financial institution server 220 may also analyze current user data to determine whether the event type associated with the recurring event occurred during the specified time interval. The current user data may be analyzed under specific circumstances, for example, when it is determined that the user communication device 230 is within a specified range of the location parameter. If a determination is made that the user communication device 230 was not within the specified range of the location parameter or that the event type did not occur during the specified time interval, the financial security tool may generate and transmit a confirmation message to the remote user device indicating that the user was able to successfully avoid engaging in the recurring event.

In some embodiments, the suggested modification may include progress parameters for each recurring event in the suggested modification. The financial security tool may update the progress parameters based on a determination that the recurring event did, or did not occur. The financial security tool may also take certain actions when the user is, or is not, able to successfully avoid the recurring event. For example, where the event type is a purchase transaction and the contextual parameters define a purchase amount associated with the purchase transaction, the financial security tool operating on the financial institution server 220 may automatically, or upon user direction, initiate a funds transfer between different accounts of the user. As another example, the financial security tool, based on a determination that the event type did occur, may adjust or revise the suggested modification and its constituent recurring events, for example, in order to improve the financial security score of the user as originally planned. The financial security tool may transmit the revised suggested modification to the user communication device 230 for presentation to and modification by the user, as described above.

Once generated, the financial security score may be updated based on a variety of triggering events, including any changes to the information underlying the calculations made by the financial security tool. In some embodiments, for example, the financial security score, including each individual financial security score portion, may be automatically recalculated at fixed time intervals to account for any changes in the user's profile. The interval at which information is updated may depend on the type of information that is being requested and the source of such information, particularly where the information is gathered from a linked account. For example, information regarding a user's credit card account may be updated daily and information regarding the user's savings account may be updated monthly.

Additionally or alternatively, the user's profile may change based on the user purchasing products, increasing savings, and accomplishing particular goals or undertaking certain tasks. In some embodiments, these same events may independently and automatically trigger an update to the financial security score. In such cases, the process is further aided by leveraging information regarding the various financial products and services owned by the user, both those held with the financial institution itself and those held with third parties. More generally, the score may be updated when the user updates the profile, for example, to change their marital status. The user may also have the ability to force an update of the financial security score. To that end, the user may choose to undertake the survey inquiry once more, where it will be pre-populated with the information previously submitted by the user.

Upon updating the financial security score, the financial security tool may also choose to update other information generated for the user. For example and without limitation, the financial security tool may update the information presented in the financial security score card, including any suggestions as to the user's plan of action. In this way, the user will always be presented with information and suggestions reflecting the user's current financial security status.

The financial security tool may also include the financial security score in future communications with the user, which may be presented to the user the next time the user calls the financial institution, visits the financial institution website, or uses a financial institution application on the user's mobile device. The financial security tool may further integrate the financial security score card in such communications by presenting the user with additional information regarding and/or additional features involving the users financial security score.

The financial security tool may integrate the financial security in communicating with the user in the form of a security score tile. For example, the financial security tool may present information relating to the financial security score, in particular the score itself, as a tile on the user's default account screen. The tile may appear automatically upon completion of the survey inquiry, or the financial security tool may prompt the user to add the tile to the user's account screen, which the user may later remove. As the user's financial security score changes, so too will the tile.

The tile may have various properties allowing the user to readily identify the information. For example, the tile may reside in a fixed location on the account screen, and may present the relevant information as a number, symbol, picture, color, texture, or combination thereof. By selecting a readily identifiable indicator, the financial security tool may allow the user to quickly locate the desired information, thereby increasing the user's familiarity and utilization of the information that it may provide.

The financial security tool may also allow the user to set particular goals relating to the financial institutions adopted set of core beliefs or features and aspects thereof. The financial security tool may identify particular essential goals to present to the user, for example and without limitation, goals relating to debt reduction, retirement planning, and the user's emergency fund. Additionally, the financial security tool may allow the user to have more personalized goals, which may include, for example, the purchase of an automobile or a home, saving for home improvements, a dependents education, or a family vacation, The financial security tool may also provide the user with specific information and/or tools to help plan and address these goals. In particular, the financial security tool may generate an action plan for the user to follow to achieve these goals, and the financial security tool may interface with other products or services, held with the financial institution or a third party, to monitor the user's progress. The user may also be able to manually update their progress towards a certain goal, or to adjust the goal in some other manner.

The financial security tool may also identify upcoming events that will affect the user's financial security score, and may assess the particular effects that such an event may have on a particular core belief or categorical grouping. In doing so, the financial security tool may leverage information regarding various financial products or services already held by the user with the financial institution itself or with other third parties. For example, the financial security tool may identify that the user is nearing their final payment for a car loan held with the financial institution.

The financial security tool may present the user with a detailed explanation regarding how the user's score will change after the event occurs. This explanation may involve techniques similar to those described earlier with reference to FIG. 11. In general, the user may be presented with specific quantitative and qualitative effects that the action may have on the user's overall financial security score. For example, the financial security tool may generate the user's financial security score as if the loan had been successfully paid off, and may present the user with a comparison of the user's current financial security score and the user's projected financial security score after the event occurs. The user may also be provided with an assessment of how the occurrence of that event may affect the user's progress towards particular goals and, more generally, the user's overall financial security. The user may also be presented with suggestions as to what actions the user may want to take next. For example, in situations where the event has a negative effect on the user's financial security score, the user may be presented with an action plan or a set of steps which the user may take to restore, or possibly improve, the user's financial security score.

The financial security tool may also provide forward looking guidance to the user regarding significant actions the user may hope to take or important events that may occur in the user's future. The object of providing such information is, in part, to better inform the user about the consequences that certain decisions may have, or the impact that certain events may have on the user's financial security. Such information may also allow the user to take advanced steps to better prepare for making a certain decision or the occurrence of a major life event.

The financial security tool may automatically identify certain actions or events which may occur in the user's future and which may potentially impact the user's financial security. In identifying potentially events or decisions in the user's life, the financial security tool may look at the user's general demographic information. For example, based upon the user's age and marital status the financial security tool may determine that the user may be considering purchasing a home or having children. The financial security tool may also use information related to existing financial products and services held by the user, or even responses provided by the user in the initial survey inquiry. For example, the financial security tool may note the age of the drivers on a user's automobile insurance policy to predict that the user may have children entering college soon, which may suggest that the user is concerned about the cost of college tuition. The user may then be prompted to select one of the identified hypothetical scenarios. The user may also have the option to view a complete list of potential scenarios for which the financial security tool may provide guidance. Additionally or alternatively, the user may be presented with the ability to define a custom scenario of the user's choosing.

In order to provide guidance regarding these hypothetical scenarios, the financial security tool may query the user for additional information regarding a particular hypothetical scenario. For example, if the user were interested in purchasing a home, the financial security tool may prompt the user to enter information regarding the home's value, monthly mortgage payment, or the like. In the case of a custom scenario, the user may be prompted for general parameters of the problem, for example, whether or not the payment is recurring in nature. The financial security tool may also pre-populate the form sent to the user with typical or average value for a particular parameter. Alternatively, the form could be pre-populated based on values considered to be appropriate given the user's current level of financial security. The financial security tool may also leverage information regarding financial products or services already owned by the user, as well as information entered in the general survey inquiry. The financial security tool may, for example, use the user's address to identify average home prices in the area, and may further adjust the home prices by limiting the pool of houses considered in the calculation to those having access to good schools for the user's children. The importance of having a good school district may have been indicated by the user on the information request form.

The financial security tool may also present the user with a detailed explanation regarding how the user's score may change if a particular event occurs or decision is taken. This explanation may involve techniques similar to those described earlier with reference to FIG. 11. In general, the user may be presented with specific quantitative and qualitative effects that the action may have on the user's overall financial security score. For example, the financial security tool may generate the user's financial security score as if the user were to purchase a car, which the user may have indicated was to be an expensive sports car. The user may then be presented with a comparison of the user's current financial security score and the user's projected financial security score after the car is purchased. The user may also be provided with an assessment of how that event may affect the user's financial security score or the user's progress towards particular goals, along with an action plan or specific suggestions as to how the user may account for any change in the user's financial security score. The financial security tool may also suggest alternative actions that could be taken instead of the given hypothetical scenario, which may be better suited for the user's level of financial security. In the case of the car purchase, for example, the financial security tool may suggest a more modest car in lieu of the sports car chosen by the user.

The financial security tool may also integrate the user's financial security score into a user's shopping experience with regards to purchasing products or services that are not financially related, thereby allowing the user to make more informed decisions regarding their personal spending habits. For example, regarding the purchase of a new car or home, the financial security tool may provide real-time, or near real-time, interactive guidance to the user regarding the effect that such a purchase may have on the user's financial security score. By presenting this information to the user, the user may be able to make a more informed decision regarding such a significant purchase. The financial security tool may generate a financial security score under the assumption that a particular home or car is chosen, and may present the user with a comparison, including a detailed explanation, of the relative changes that may occur regarding the user's financial security score. For example, the user when looking to purchase an expensive sports car may be presented with net effect that such a purchase will have on the user's overall financial security score (−15 points) along with the effect that such purchase may have on particular core beliefs or categorical groupings. For example, the user may be presented with the negative impact that an expensive car purchase may have on personal savings (−20 points) as well as the positive impact the existing automobile insurance may provide (+5 points).

The financial security tool may present this information to the user in different ways. In some embodiments, the shopping experience may be presented by the financial institution itself, for example, through a shopping portal accessible through the financial institutions website. Additionally or in the alternative, the financial security tool may integrate with third party website with whom the financial institution may have partnered. As the user is looking at different products, the financial security tool may display an indicator representing the impact that such a purchase may have on the user's financial security. The user may also be presented with such an indicator when comparing various products, providing the user with an additional personalized basis for comparing the two products. In this way, the user is informed ahead of time as to the impact a particular decision may have on the user's financial security.

Similar to the tile described earlier, the indicator may reside in a fixed location relative to a particular product offering on the shopping portal, and may present the relevant information as a number, symbol, picture, color, texture, or some combination thereof. For example, the indicator may include the numerical effect that such a purchase would have on the financial security score, along with a circular ring surrounding the number. The circular ring may be further divided into four quadrants, having potentially distinct colors, which may reflect the effect that the purchase may have on a particular core belief or categorical grouping, for example, red being negative and blue being positive. Furthermore, the indicator may be embedded into the shopping portal itself, or may exist as an overlay on top of the shopping portal. The indicator may also dynamically appear and disappear as the user interacts with the website. For example, the indicator may appear when the user interacts with a product image. The financial security tool may also provide the user with a suggested plan of action if the user is moving forward with a particular purchase, for example, during product checkout. Additionally, the financial security tool may identify relevant goals that the user may have in place, along with the effect that this purchase may have on that goal. For example, the user may be reminded of a personal savings goal which the user had set in place which may be adversely affected by the purchase of one product but not by another.

As the financial security score represents a snapshot of the user's financial security at a particular point in time, the financial security tool may also analyze events that have occurred in the user's past, and present the user with an explanation of how these events affected the users financial security score. In this way the user may be able to identify particular events that were particularly difficult for the user, which the user may thus be particularly inclined to protect against going forward. For example, the user may have become seriously ill in the past and incurred significant medical expenses, which may have negatively affected the user's financial security. The financial security tool may identify this event automatically and present the user with an explanation of why that event was significant, and suggest what the user may have done in order to better protect against the negative consequences associated with that type of event. Additionally or alternatively the financial security tool may allow the user to manually select a particular event in the user's history, and provide the user with particular suggestions or an action plan to address similar events, which may include suggestions regarding the purchase of particular financial products offered by the financial institution or other third parties.

A historical look at the user's financial security score may also allow the user to better visualize the progress they are making towards improving their financial security score. The financial security tool may also provide motivational statistics regarding the users progress, which may leverage information regarding similarly situated user's at the financial institution. For example, the financial security tool may indicate to the user that a certain percentage of users (74%) improve their score in a short time frame (within 6 months).

After calculating the user's financial security score and/or monetary risk amount, the financial security tool may present the results to the user according to one or more different pathways. The user may also be presented with information regarding significant changes in the user's financial security score over one or more different pathways. Exemplary pathways include, but are not limited to, website message pathways, email communication pathways, text message communication pathways, telephone communication pathways, and physical letter communication pathways. For example, one or more of the tables illustrated in FIG. 10 may be presented to the user by displaying the table(s) on a screen of the communication device 230 via a website message pathway.

In some embodiments, during the survey inquiry, the financial security tool may ask the user if the user wants to be contacted by the financial institution regarding the user's financial security score, monetary risk amount, suggestions for improving the financial security score, special offers, and/or other communications from the financial institution. In some embodiments, the financial security tool may simply provide the user with a yes or no input option regarding the question of whether the user wishes to be contacted by the financial institution.

In other embodiments, the financial security tool may instigate the user to answer the question according to a receptiveness scale identifying how receptive the user is to being contacted by the financial institution. According to these embodiments, the pathway in which the financial security tool selects for contacting the user may be dependent on the level of receptiveness indicated by the user. If the user indicates a high level of receptiveness, then the financial security tool may select a more sophisticated pathway for communicating with the user such as having a member of the financial institution contact the user directly. If the user indicates a low level of receptiveness, then the financial security tool may select a less sophisticated pathway for communicating with the user such as sending an email or text message.

In addition or alternatively, the financial security tool may consider user attributes when selecting a pathway for communicating with the user. For instance, certain user attributes may be considered by the financial security tool as being an indicator for the user being more receptive to certain types of communication pathways. For example, if the user's age is lower than 30 years old, this may be interpreted by the financial security tool as an indicator that the user will be more receptive to a text message or email type of communication. Similarly, if the user's age is greater than 50 years old, this may be interpreted by the financial security tool as an indicator that the user will be more receptive to a personal phone call from a member of the financial institution.

In some embodiments, the financial security tool may run the communication to the user regarding the user's financial security score and/or monetary risk amount through a contact hierarchy filter. The contact hierarchy filter determines whether the communication to the user will be transmitted to the user based on whether a previous number of communications that have been transmitted to the user has exceeded a contact limit threshold. This helps prevent the financial institution from contacting the user too many times, where contacting the user too many times is undesirable as it may decrease the effectiveness of the communications to the user.

In some embodiments, the contact hierarchy filter may simply reference the contact limit threshold such that all communications are transmitted to the user until the contact limit threshold is exceeded. This includes communications related to the user's financial security score, monetary risk amount, and other communications from the financial institution.

In other embodiments, the contact hierarchy filter may be more sophisticated in its method of limiting the number of communications that are sent out to the user. For example, each communication that is generated for transmission to the user may have a priority value associated with it prior to being transmitted to the user. The financial security tool may then implement the contact hierarchy filter to transmit the communications in the order of the communication's associated priority value. The financial security tool may then transmit the communications in an order according to the communication's priority value (higher priority value before lower priority value), until the predetermined contact limit threshold is met. This process may be implemented for a specific time limit. For example, the contact threshold limit may correspond to a set time period (e.g., 1 week), such that the contact threshold limit is reset after the set time period to allow for communications to be transmitted to the user again.

Such a sophisticated contact hierarchy filter is not limited to just communications related to the user's financial security score and monetary risk amount, but may be applicable to other communications from the financial institution to the user. In addition, the priority value may be assigned based on whether the corresponding communication includes information regarding the user's health or security. For example, a communication that includes information that may concern the user's health or security may be assigned a greater priority value than a communication that does not include information concerning the user's health or security. The user's security may be regarded in terms of physical security, or financial security.

In addition or alternatively, the financial security tool may track a user's interaction habits with the financial institution when selecting one or more of the financial institution's financial products to offer the user. For example, the financial security tool may track offers for financial products that were previously accepted, or not accepted, by the user. The financial security tool may also track links or offers in previous communications that were selected or accepted, or not, by the user. And the financial security tool may also track webpages in the financial institution's website that were visited by the user, where the webpages may have contained information detailing a specific financial product offered by the financial institution. In this way, the user's past habits may be referenced by the financial security tool to develop leads on which of the financial institution's financial product offerings will be presented to the user. After selecting the financial product offerings and including them into corresponding communications to the user, the communications may still be filtered through the contact hierarchy filter in order to make the final determination on whether to transmit the communication to the user.

Figure 12:
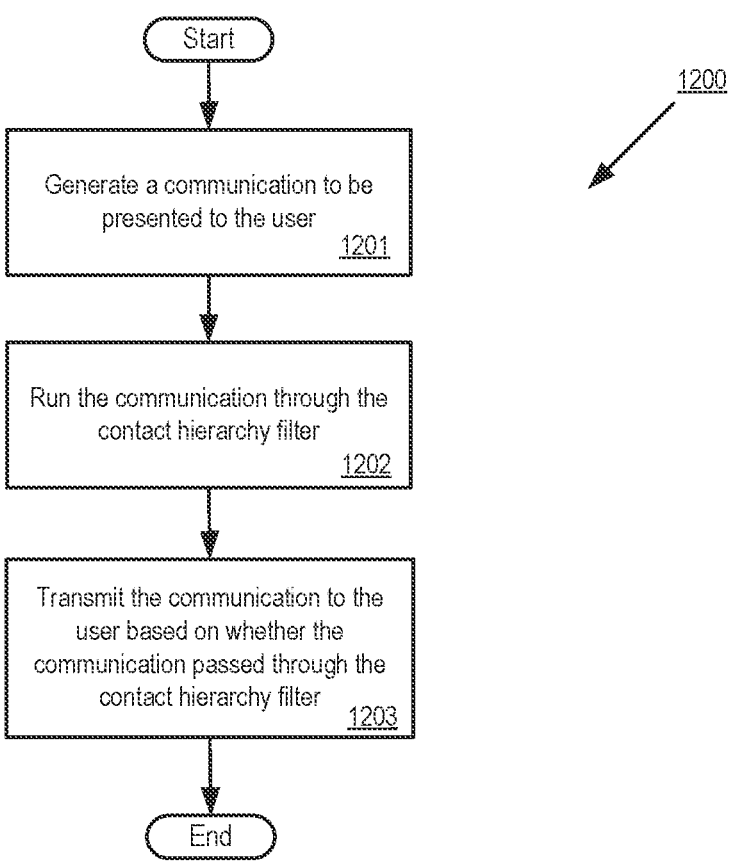
FIG. 12 illustrates an exemplary flow chart describing a process for transmitting a communication to the user, according to the present invention.

FIG. 12 illustrates a flow chart 1200 describing a process for transmitting a communication to the user. The communication may be a message on a website, an email communication, text message communication, telephone communication, physical letter communication, or other type of communication that may be prepared by the financial security tool and transmitted to the user.

At 1201, a communication is generated by the financial security tool. The communication may include information identifying the user's financial security score and/or monetary risk amount generated as described above, suggestions for improving the user's financial security score as described above, financial product offerings from the financial institution, and/or other messages or information the financial institution may want to convey to the user.

At 1202, the communication may be filtered through the contact hierarchy filter, as described above. For example, the financial security tool may first determine whether a number of times that the financial institution has contacted the user exceeds a contact limit threshold. If the number of times the user has already been contacted exceeds the contact limit threshold, the contact hierarchy filter may prevent the current communication from being transmitted to the user. In some embodiments, the contact hierarchy filter may reference a priority value associated with the communication in order to determine whether to allow the communication to be transmitted to the user, as described above.

At 1203, the communication is transmitted based on whether the contact hierarchy filter allowed the communication to be transmitted, as described above at 1202.

Figure 13:
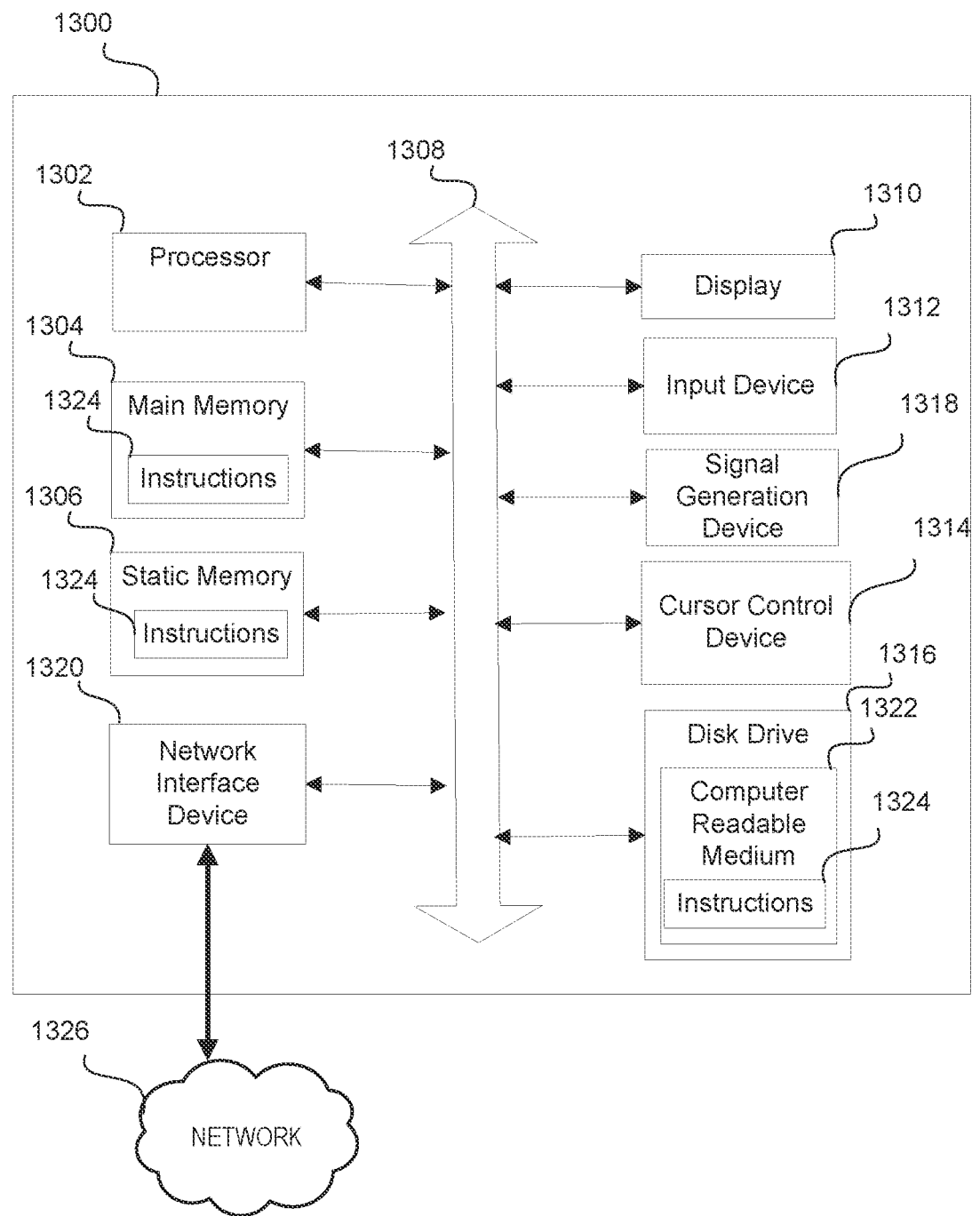
FIG. 13 illustrates a computer system which may be implemented as one or more parts of the system illustrated in FIG. 2.

Referring to FIG. 13, an illustrative embodiment of a general computer system that may be used for one or more of the components shown in FIG. 2, or in any other system configured to carry out the methods discussed above, is shown and is designated 1300. For example, any one or more of the communication device 230 or the financial institution server 220, may be implemented as the computer system 1300.

The computer system 1300 can include a set of instructions that can be executed to cause the computer system 1300 to perform any one or more of the methods, processes or computer-based functions disclosed herein. For example, the financial security tool may be a program that is comprised of a set of instructions that are executed to cause the communication device 230 perform any one or more of the methods, processes or computer-based functions described herein. The computer system 1300 may be mobile or non-mobile, operate as a stand-alone device, or may be connected using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 1300 can also be implemented as, or incorporated into, various devices, such as a personal computer ("PC"), a tablet PC, a set-top box ("STB"), a personal digital assistant ("PDA"), a mobile device such as a smart phone or tablet, a palmtop computer, a laptop computer, a desktop computer, a network router, switch or bridge, or any other machine capable of executing a set of instructions (sequential or otherwise) that specify actions to be taken by that machine. In a particular embodiment, the computer system 1300 can be implemented using electronic devices that provide voice, video or data communication. Further, while a single computer system 1300 is illustrated, the term "system" shall also be taken to include any collection of systems or sub-systems that individually or jointly execute a set, or multiple sets, of instructions to perform one or more computer functions.

As illustrated in FIG. 13, the computer system 1300 may include a processor 1302, such as a central processing unit ("CPU"), a graphics processing unit ("GPU"), or both. Moreover, the computer system 1300 can include a main memory 1304 and a static memory 1306 that can communicate with each other via a bus 1308. As shown, the computer system 1300 may further include a video display unit 1310, such as a liquid crystal display ("LCD"), an organic light emitting diode ("OLED"), a flat panel display, a solid state display, or a cathode ray tube ("CRT"). Additionally, the computer system 1300 may include one or more input devices 1312, such as a keyboard, scanner, digital camera for image capture and/or visual command recognition, touch screen or audio input device, and a cursor control device 1314, such as a mouse or touchpad. The computer system 1300 can also include a disk drive unit 1316, a signal generation device 1318, such as a speaker or remote control, and a network interface device 1320.

In a particular embodiment, as depicted in FIG. 13, the disk drive unit 1316 may include a computer-readable medium 1322 in which one or more sets of instructions 1324, such as software, can be embedded. Further, the instructions 1324 may embody one or more of the methods or logic as described herein. In a particular embodiment, the instructions 1324 may reside completely, or at least partially, within the main memory 1304, the static memory 1306, and/or within the processor 1302 during execution by the computer system 1300. The main memory 1304 and the processor 1302 also may include computer-readable media.

In an alternative embodiment, dedicated hardware implementations, including application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 1324 or receives and executes instructions 1324 responsive to a propagated signal; so that a device connected to a network 1326 can communicate voice, video or data over the network 1326. Further, the instructions 1324 may be transmitted or received over the network 1326 via the network interface device 1320. For example, the network 1326 may correspond to the network(s) 210 illustrated in FIG. 2.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any tangible medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories, such as flash memory. Further, the computer-readable medium can be a random access memory or other volatile re-writable memory. Additionally, the computer-readable medium can include a magneto-optical or optical medium, such as a disk or tapes or other storage device to capture information communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols commonly used by financial institutions, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A method, comprising:

using a financial security tool partitioned between a financial institution server and a processor of a mobile device of a user to aggregate transactional data from different user accounts, model the aggregated transactional data, identify a pattern of repeated transactions, and define a discretionary user spending habit based on the pattern of repeated transactions, the discretionary spending habit comprising a recurring event having an amount parameter, a temporal parameter capturing a timeframe for an expected occurrence, and a location parameter identifying a target location;

periodically activating, with the financial security tool executing on the user communication device, GPS circuitry at the mobile device for a specified time interval starting before the expected occurrence and ending after the expected occurrence;

determining, with the financial security tool, a current location of the mobile device by initiating communication with GPS satellites and calculating the current location of the mobile device based on information received from the GPS satellites;

comparing, with the financial security tool, the current location of the mobile device to the target location to determine whether the current location of the mobile device is within range of a target location;

analyzing, with the financial security tool operating on the financial institution server, current user data to determine when the mobile device is within range of the target location during the specified time interval to determine whether the recurring event occurred; and automatically initiating, by the financial security tool operating on the financial institution server, a funds transfer equal to the amount parameter after the specified time interval has elapsed using an account relationship previously defined by the user based on a determination from the current user data that the mobile device was not within the range of the target location during the specified time interval or the recurring event did not occur during the specified time interval.

2. The method of claim 1, further comprising:

analyzing, by the processor, a historical dataset of a user to identify the recurring event, wherein the recurring event is modeled as an event type and a set of contextual parameters, where the event type comprises the purchase transaction and the set of contextual parameters comprises the timing parameter, the location parameter for the target location, and the purchase amount; and determining, by the processor, a suggested modification for modifying the recurring event to improve the user security score.

3. The method of claim 1, wherein the method further comprises:

displaying, with the processor, a confirmation message on a display of the mobile device after the specified time interval has elapsed based on a determination that the mobile device was not within the range of the target location during the specified time interval.

4. The method of claim 1, wherein the method further comprises:

displaying, with the processor, a confirmation on a display of the mobile device after the specified time interval has elapsed based on a determination that the event type did not occur during the specified time interval.

5. The method of claim 2, wherein:

the suggested modification comprises a progress parameter for the recurring event in the suggested modification; and the method further comprises:

analyzing current user data when the mobile device is within range of the target location to determine whether the event type occurred; and updating the progress parameter based on a determination that the event type did occur.

6. The method of claim 5, wherein the method further comprises generating, with the processor, a revised suggested modification for the user based on a determination that the event type did occur.

7. The method of claim 1, wherein the funds are transferred from a checking account of the user to another account of the user.

8. A mobile device, comprising:

a memory; and a processor in communication with the memory, the processor executing instructions for a financial security tool stored in the memory and partitioned between the processor and a financial institution server to:

aggregate transactional data from different user accounts;

model the aggregated transactional data;

identify a pattern of repeated transactions;

define a discretionary user spending habit based on the pattern of repeated transactions, the discretionary spending habit comprising a recurring event having an amount parameter, a temporal parameter capturing a timeframe for an expected occurrence, and a location parameter identifying a target location;

periodically activate with the financial security tool executing on the processor GPS circuitry at the mobile device for a specified time interval starting before the expected occurrence and ending after the expected occurrence;

determine a current location of the mobile device by initiating communication with GPS satellites and calculating the current location of the mobile device based on information received from the GPS satellites;

compare the current location of the mobile device to the target location to determine whether the current location of the remote device is within range of a target location;

analyze with the financial security tool operating on the financial institution server current user data to determine when the mobile device is within range of the target location during the specified time interval to determine whether the recurring event occurred; and automatically initiate with the financial security tool operating on the financial institution server a funds transfer equal to the amount parameter after the specified time interval has elapsed using an account relationship previously defined by a user of the mobile device based on a determination from the current user data that the mobile device was not within the range of the target location during the specified time interval or the recurring event did not occur during the specified time interval.

9. The apparatus of claim 8, wherein the processor further executes instructions for the financial security tool to:

analyze a historical dataset of a user to identify the recurring event, wherein the recurring event is modeled as an event type and a set of contextual parameters, where the event type comprises the purchase transaction and the set of contextual parameters comprises the timing parameter, the location parameter for the target location, and the purchase amount; and determine a suggested modification for modifying the recurring event to improve the user security score.

10. The apparatus of claim 8, wherein the processor further executes instructions for the financial security tool to:

display a confirmation message on a display of the mobile device after the specified time interval has elapsed based on a determination that the mobile device was not within the range of the target location during the specified time interval.

11. The apparatus of claim 8, wherein the processor further executes instructions for the financial security tool to:

display a confirmation message on a display of the mobile device after the specified time interval has elapsed based on a determination that the event type did not occur during the specified time interval.

12. The apparatus of claim 9, wherein:

the suggested modification comprises a progress parameter for the recurring event in the suggested modification; and the processor further executes instructions for the financial security tool to:

analyze current user data when the mobile device is within range of the target location to determine whether the event type occurred; and update the progress parameter based on a determination that the event type did occur.

13. The apparatus of claim 12, wherein the processor further executes instructions for the financial security tool to generate a revised suggested modification based on a determination that the event type did occur.

14. The apparatus of claim 8, wherein the funds are transferred from a checking account of the user to another account of the user.

* * * * *